(12) United States Patent
Shirai et al.

(10) Patent No.: US 8,061,854 B2
(45) Date of Patent: Nov. 22, 2011

(54) PROJECTION DISPLAY SYSTEM WITH VARYING LIGHT SOURCE

(75) Inventors: Akira Shirai, Hino (JP); Hirokazu Nishino, Akishima (JP); Yoshiaki Horikawa, Hachioji (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 520 days.

(21) Appl. No.: 12/231,768

(22) Filed: Sep. 4, 2008

(65) Prior Publication Data

US 2009/0091713 A1    Apr. 9, 2009

Related U.S. Application Data

(60) Provisional application No. 60/967,879, filed on Sep. 6, 2007.

(51) Int. Cl.
| | |
|---|---|
| *G03B 21/20* | (2006.01) |
| *G03B 21/28* | (2006.01) |
| *G03B 21/26* | (2006.01) |
| *G02B 5/08* | (2006.01) |
| *G09G 3/34* | (2006.01) |
| *G02F 1/00* | (2006.01) |
| *G02F 1/135* | (2006.01) |

(52) U.S. Cl. ............ 353/85; 353/31; 353/99; 353/94; 359/850; 345/84; 348/771; 349/30

(58) Field of Classification Search ........... 353/85, 353/98, 31, 99, 94; 359/850; 345/84; 348/771; 349/30

See application file for complete search history.

(56) References Cited

U.S. PATENT DOCUMENTS

| | | | |
|---|---|---|---|
| 4,229,732 A | 10/1980 | Hartstein | |
| 4,662,746 A | 5/1987 | Hornbeck | |
| 5,214,420 A | 5/1993 | Thompson et al. | |
| 5,285,407 A | 2/1994 | Gale | |
| 5,537,258 A | 7/1996 | Yamazaki et al. | |
| 5,583,688 A | 12/1996 | Hornbeck | |
| 5,617,243 A | 4/1997 | Yamazaki et al. | |
| 5,668,611 A * | 9/1997 | Ernstoff et al. | 348/771 |
| 6,198,180 B1 | 3/2001 | Garcia | |
| 6,618,185 B2 * | 9/2003 | Sandstrom | 359/292 |
| 6,813,062 B2 * | 11/2004 | Sandstrom | 359/292 |
| 6,992,810 B2 | 1/2006 | Pan | |
| 7,207,677 B2 | 4/2007 | Takeda et al. | |
| 2005/0190429 A1 | 9/2005 | Ishii | |
| 2006/0066820 A1 | 3/2006 | Kimurai | |
| 2006/0152690 A1 | 7/2006 | DiCarlo | |
| 2006/0176323 A1 | 8/2006 | Bommersbach et al. | |

* cited by examiner

*Primary Examiner* — Georgia Y Epps
*Assistant Examiner* — Magda Cruz
(74) *Attorney, Agent, or Firm* — Bo-In Lin

(57) ABSTRACT

The present invention provides a projection apparatus, comprising: a light source; at least one spatial light modulator for modulating illumination light from the light source by a plurality of pixel elements by using different modulation states; a light source control unit performing a modulation control of the light source; and a spatial light modulator control unit generating, from an input image signal, a control signal for driving the spatial light modulator, wherein: the light source control unit has a function of receiving data corresponding to the control signal generated by the spatial light modulator control unit, controlling a parameter of an emission pulse of the illumination light emitted from the light source, and thereby adjusting an emission intensity of the illumination light.

25 Claims, 31 Drawing Sheets

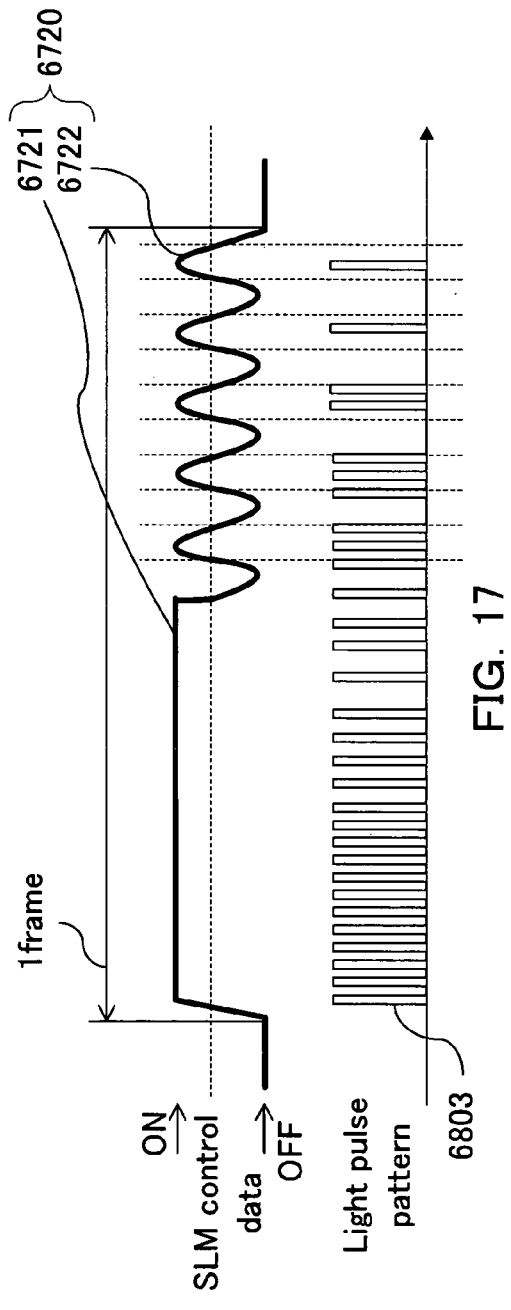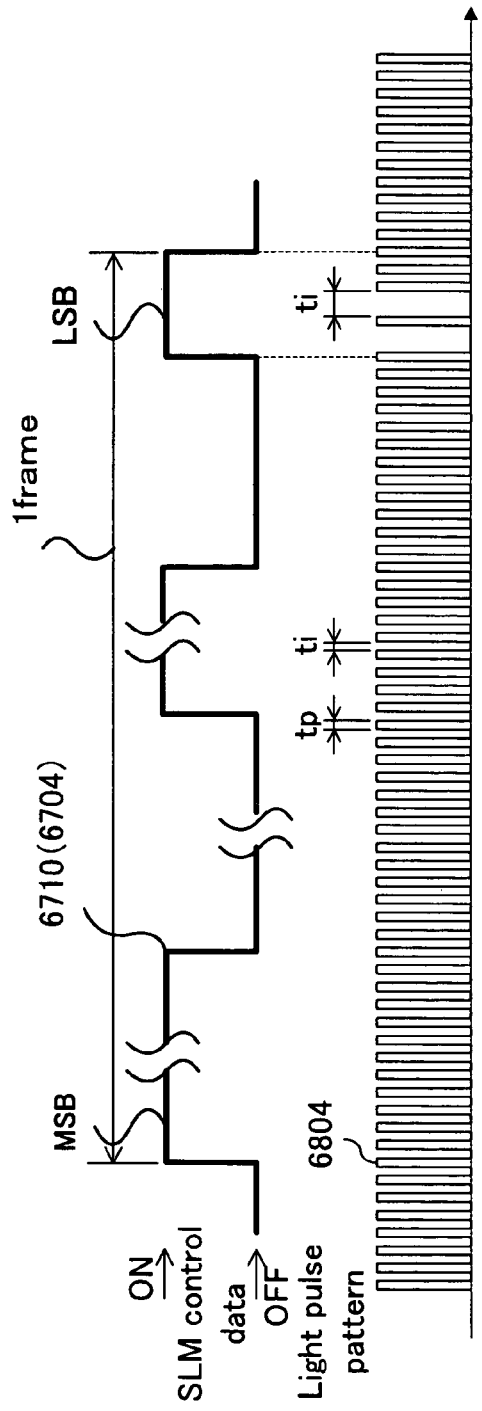

PROJECTION DISPLAY SYSTEM WITH VARYING LIGHT SOURCE

This application is a Non-provisional Application claiming a Priority date of Sep. 6, 2007 based on a previously filed Provisional Application 60/967,879 and a Non-provisional patent application Ser. No. 11/121,543 filed on May 3, 2005 issued into U.S. Pat. No. 7,268,932 and another Non-provisional application Ser. No. 10/698,620 filed on Nov. 1, 2003. The application Ser. No. 11/121,543 is a Continuation In Part (CIP) Application of three previously filed Applications. These three applications are Ser. Nos. 10/698,620 filed on Nov. 1, 2003, 10/699,140 filed on Nov. 1, 2003 now issued into U.S. Pat. No. 6,862,127, and 10/699,143 filed on Nov. 1, 2003 now issued into U.S. Pat. No. 6,903,860 by the Applicant of this Patent Applications. The disclosures made in these Patent Applications are hereby incorporated by reference in this Patent Application.

BACKGROUND OF THE INVENTION

1. Field of the Invention

The present invention relates to a technology that can be advantageously applied to a projection apparatus or the like having a spatial light modulator.

2. Description of the Related Art

Even though there are significant advances made in recent years on the technologies of implementing electromechanical micro-mirror devices as spatial light modulator, there are still limitations and difficulties when employed to provide high quality images display. Specifically, when the display images are digitally controlled, the image qualities are adversely affected due to the fact that the image is not displayed with sufficient number of gray scales.

Electromechanical micro-mirror devices have drawn considerable interest because of their application as spatial light modulators (SLMs). A spatial light modulator requires an array of a relatively large number of micro-mirror devices. In general, the number of devices required ranges from 60,000 to several million for each SLM. Referring to FIG. 1A for a digital video system 1 disclosed in a relevant U.S. Pat. No. 5,214,420 that includes a display screen 2. A light source 10 is used to generate light energy for ultimate illumination of display screen 2. Light 9 generated is further concentrated and directed toward lens 12 by mirror 11. Lens 12, 13 and 14 form a beam columnator to operative to columnate light 9 into a column of light 8. A spatial light modulator 15 is controlled by a computer through data transmitted over data cable 18 to selectively redirect a portion of the light from path 7 toward lens 5 to display on screen 2. The SLM 15 has a surface 16 that includes an array of switchable reflective elements, e.g., micro-mirror devices 32, such as elements 17, 27, 37, and 47 as reflective elements attached to a hinge 30 that shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

The on-and-off states of micro-mirror control scheme as that implemented in the U.S. Pat. No. 5,214,420 and by most of the conventional display system imposes a limitation on the quality of the display. Specifically, then applying conventional configuration of control circuit has a limitation that the gray scale of conventional system (PWM between ON and OFF states) is limited by the LSB (least significant bit, or the least pulse width). Due to the On-Off states implemented in the conventional systems, there is no way to provide shorter pulse width than LSB. The least brightness, which determines gray scale, is the light reflected during the least pulse width. The limited gray scales lead to degradations of image display.

Specifically, in FIG. 1C an exemplary circuit diagram of a prior art control circuit for a micro-mirror according to U.S. Pat. No. 5,285,407. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a wordline. Latch 32a is formed from two cross-coupled inverters, M5/M6 and M7/M8, which permit two stable states. State 1 is Node A high and Node B low and state 2 is Node A low and Node B high.

The dual states switching as illustrated by the control circuit controls the micro-mirrors to position either at an ON of an OFF angular orientation as that shown in FIG. 1A. The brightness, i.e., the gray scales of display for a digitally control image system is determined by the length of time the micro-mirror stays at an ON position. The length of time a micro-mirror is controlled at an ON position is in turned controlled by a multiple bit word. For simplicity of illustration, FIG. 1D shows the "binary time intervals" when control by a four-bit word. As that shown in FIG. 1D, the time durations have relative values of 1, 2, 4, 8 that in turn define the relative brightness for each of the four bits where 1 is for the least significant bit and 8 is for the most significant bit. According to the control mechanism as shown, the minimum controllable differences between gray scales for showing different brightness is a brightness represented by a "least significant bit" that maintaining the micro-mirror at an ON position.

In a simple example, and assuming n bits of gray scales, the frame time is divided into $2^n-1$ equal time slices. For a 16.7 milliseconds frame period and n-bit intensity values, the time slice is $16.7/(2^n-1)$ milliseconds Having established these times, for each pixel of each frame, pixel intensities are quantized, such that black is 0 time slices, the intensity level represented by the LSB is 1 time slice, and maximum brightness is $2^n-1$ time slices. Each pixel's quantized intensity determines its on-time during a frame period. Thus, during a frame period, each pixel with a quantized value of more than 0 is on for the number of time slices that correspond to its intensity. The viewer's eye integrates the pixel brightness so that the image appears the same as if it were generated with analog levels of light.

For addressing deformable mirror devices, PWM calls for the data to be formatted into "bit-planes", each bit-plane corresponding to a bit weight of the intensity value. Thus, if each pixel's intensity is represented by an n-bit value, each frame of data has n bit-planes. Each bit-plane has a 0 or 1 value for each display element. In the PWM example described in the preceding paragraphs, during a frame, each bit-plane is separately loaded and the display elements are addressed according to their associated bit-plane values. For example, the bit-plane representing the LSBs of each pixel is displayed for 1 time slice.

Projection apparatuses such as described above generally use a light source such as a high-pressure mercury lamp, a xenon lamp, or the like. However, these types of light sources are poor in performing high-speed switching between ON and OFF. Accordingly, a light source is usually controlled to be always in an ON state during the use of the projection apparatus, which causes a large mount of heat and waste of light and electric power.

Also, there is an increasing demand that projection apparatuses should display (project) images at a higher level of gray scale (gradation). Accordingly, a spatial light modulator has to be controlled to permit a projection apparatus to project images at a higher level of gray scale. However, if the improvement of the gray scale performance is to be achieved only through the control of the spatial light modulator, the improvement would be only to a limited level.
Patent Document 1: U.S. Pat. No. 5,214,420
Patent Document 2: U.S. Pat. No. 5,285,407

SUMMARY OF THE INVENTION

It is an object of the present invention to provide a technology that can realize the reduction of head generation and electric power consumption in a light source in a projection apparatus comprising a spatial light modulator.

It is another object of the present invention to provide a technology that realizes various and high performance display gray scale without being limited by the display gray scale performance of a spatial light modulator in a projection apparatus having a spatial light modulator.

A first aspect of the present invention provides a projection apparatus, comprising:
a light source;
at least one spatial light modulator for modulating illumination light from the light source by a plurality of pixel elements by using different modulation states;
a light source control unit performing a modulation control of the light source; and
a spatial light modulator control unit generating, from an input image signal, a control signal for driving the spatial light modulator, wherein:
the light source control unit has a function of receiving data corresponding to the control signal generated by the spatial light modulator control unit, controlling a parameter of an emission pulse of the illumination light emitted from the light source, and thereby adjusting an emission intensity of the illumination light.

A second aspect of the present invention provides the projection apparatus according to the first aspect, wherein:
the parameter of the emission pulse controlled by the light source control unit is at least a pulse frequency.

A third aspect of the present invention provides the projection apparatus according to the first aspect, wherein:
the parameter of the emission pulse controlled by the light source control unit is at least a pulse width.

A fourth aspect of the present invention provides the projection apparatus according to the first aspect, wherein:
the parameter of the emission pulse controlled by the light source control unit is at least a pulse intensity.

A fifth aspect of the present invention provides the projection apparatus according to the first aspect, wherein:
the parameter of the emission pulse controlled by the light source control unit is at least a current value for driving the light source.

A sixth aspect of the present invention provides the projection apparatus according to the first aspect, wherein:
the light source control unit controls the parameter of the emission pulse for each one frame or for each one sub-frame.

A seventh aspect of the present invention provides the projection apparatus according to the first aspect, wherein:
the data corresponding to the control signal is transmitted by the spatial light modulator.

A eighth aspect of the present invention provides the projection apparatus according to the first aspect, wherein:
the light source is a laser diode or a light emitting diode (LED).

A ninth aspect of the present invention provides the projection apparatus according to the first aspect, wherein:
the spatial light modulator is a digital micromirror device which includes a plurality of movable mirrors corresponding to pixels to be displayed, and modulating the illumination light by operations of the movable mirrors.

A tenth aspect of the present invention provides the projection apparatus according to the ninth aspect, wherein:
the movable mirrors have an ON state of reflecting, to the projection optical system, the illumination light emitted from the light source, an OFF state of reflecting the illumination light to a position that is offset from the projection optical system, and an oscillation state in which the movable mirrors oscillate between the ON state and the OFF state.

A eleventh aspect of the present invention provides the projection apparatus according to the tenth aspect, wherein:
when the movable mirrors are in a state other than the OFF state, the light source control unit controls the parameter of the emission pulse.

A twelfth aspect of the present invention provides the projection apparatus according to the first aspect, wherein:
the light source control unit performs a control so as to stop emission of the light source during a period other than a period during which the control signal generated by the spatial light modulator control unit drives the spatial light modulator.

A thirteenth aspect of the present invention provides the projection apparatus according to the first aspect, comprising:
a plurality of the spatial light modulators, wherein:
the spatial light modulator control unit generates the control signal for driving the plurality of spatial light modulators; and
the light source control unit receives data corresponding to the control signal for driving each of the spatial light modulators, and controls the parameter of the emission pulse of the illumination light emitted to the spatial light modulators from the light source.

A fourteenth aspect of the present invention provides a projection apparatus, comprising:
light sources of at least red (R), green (G), and blue (B);
at least one spatial light modulator for modulating illumination light from the light sources by a plurality of pixel elements by using different modulation states;
a light source control unit performing a modulation control of the light sources; and
a spatial light modulator control unit generating, from an input image signal, a control signal for driving the spatial light modulator, wherein:
the light source control unit has a function of receiving data corresponding to the control signal generated by the spatial light modulator control unit, controlling parameters of emission pulses of the illumination light emitted from the light sources of the respective colors of R/G/B, and thereby adjusting emission intensities of the illumination light of the respective colors of R/G/B.

A fifteenth aspect of the present invention provides the projection apparatus according to the fourteenth aspect, wherein:

the light source control unit controls the parameter of the emission pulse for the light source of each of R/G/B synchronously with the control signal generated by the spatial light modulator control unit.

A sixteenth aspect of the present invention provides the projection apparatus according to the fourteenth aspect, wherein:

the parameter of the emission pulse controlled by the light source control unit is at least a pulse frequency.

A seventeenth aspect of the present invention provides the projection apparatus according to the fourteenth aspect, wherein:

the parameter of the emission pulse controlled by the light source control unit is at least a pulse width.

A eighteenth aspect of the present invention provides the projection apparatus according to the fourteenth aspect, wherein:

the parameter of the emission pulse controlled by the light source control unit is at least a pulse intensity.

A nineteenth aspect of the present invention provides the projection apparatus according to the fourteenth aspect, wherein:

the light source is a light emitting diode (LED) or a laser device.

A twentieth aspect of the present invention provides a projection apparatus, comprising:

at least one light source provided for each color of illumination light;

a light source control device for controlling output of the light source;

at least one micromirror device in which a plurality of mirror elements for deflecting the illumination light from the light source are arranged;

a micromirror device control device for controlling the micromirror device; and a projection optical system for projecting, to a screen, the illumination light deflected by the micromirror device, wherein:

emission intensity of the illumination light is adjusted in accordance with a value of a brightness to be modulated.

A twenty-first aspect of the present invention provides the projection apparatus according to the twentieth aspect, wherein:

the micromirror device control device has a function of controlling the mirror elements so that the mirror elements get in one of an ON state of leading, to the projection optical system, the illumination light to be deflected, an OFF state of diverting, from the projection optical system, the illumination light to be deflected, and an intermediate output state in which the mirror elements oscillate between the ON state and the OFF state; and the mirror elements are controlled in accordance with a brightness output value to be modulated.

A twenty-second aspect of the present invention provides the projection apparatus according to the twentieth-first aspect, wherein:

when a brightness output value to be modulated is equal to or greater than brightness output obtained if the intermediate output state is continued entirely during a display period of one frame of said each color, a modulation is performed so that output is performed entirely during a display period of one frame of said each color on the basis of a combination of the ON state and the intermediate output state.

A twenty-third aspect of the present invention provides the projection apparatus according to the twentieth aspect, wherein:

the light source is a light emitting diode (LED) or a laser device.

A twenty-fourth aspect of the present invention provides the projection apparatus according to the twenties aspect, wherein:

the emission intensity of the illumination light is adjusted in accordance with an area size of a pulse output from the light source control device.

A twenty-fifth aspect of the present invention provides the projection apparatus according to the twenty-fourth aspect, wherein:

an area size ratio of pulses output from the light source control device is a multiple of two.

BRIEF DESCRIPTION OF THE DRAWINGS

The present invention is described in detail below with reference to the following figures.

FIG. 5A is a side view diagram showing an example of a deflection state when the mirror is ON;

FIG. 17 is a chart exemplifying the control signal of a chirp modulation performed in a projection apparatus according to the embodiment of the present invention;

FIG. 18 is a chart exemplifying a control signal using binary data performed in a projection apparatus according to the embodiment of the present invention;

DESCRIPTION OF THE PREFERRED EMBODIMENTS

Hereinafter, preferred embodiments of the present invention will be explained by referring to <<Disclosure Contents>> provided below.

Disclosure Content 1

Preferred Embodiment 1-1

A preferred embodiment 1-1 of the present invention relates to a mirror device configured to arranging a plurality of deflectable mirrors in array and further specifically to a method for regulating the deflection angle of a mirror.

Figure 1A:
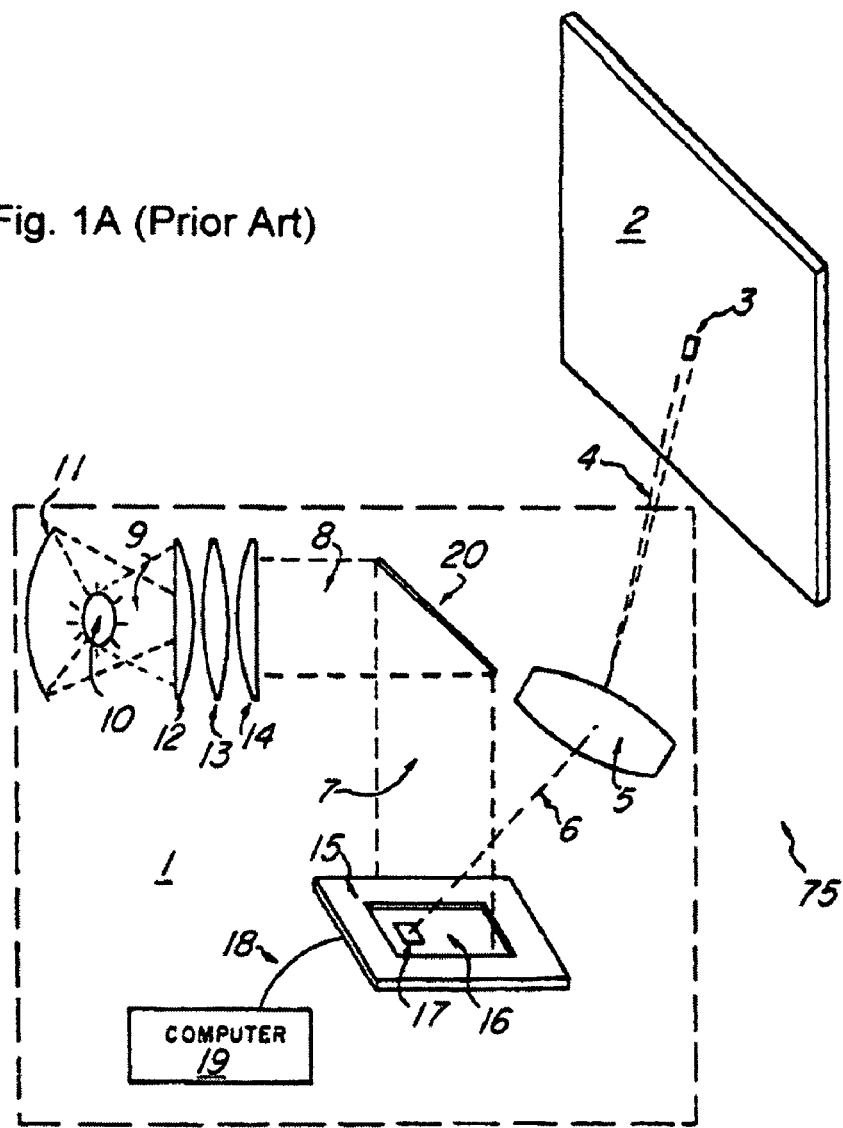
FIG. 1A is a conceptual diagram showing the configuration of a projection apparatus according to a conventional technique.
Figure 1B:
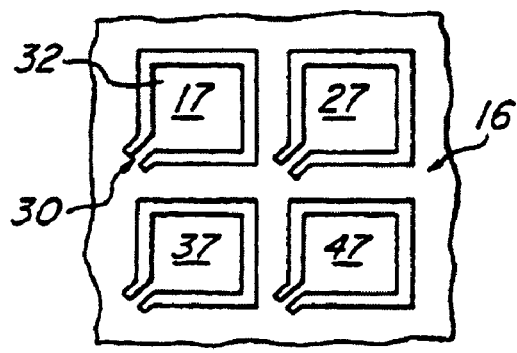
FIG. 1B is a conceptual diagram showing the configuration of a mirror element of the projection apparatus according to a conventional technique.
Figure 1C:
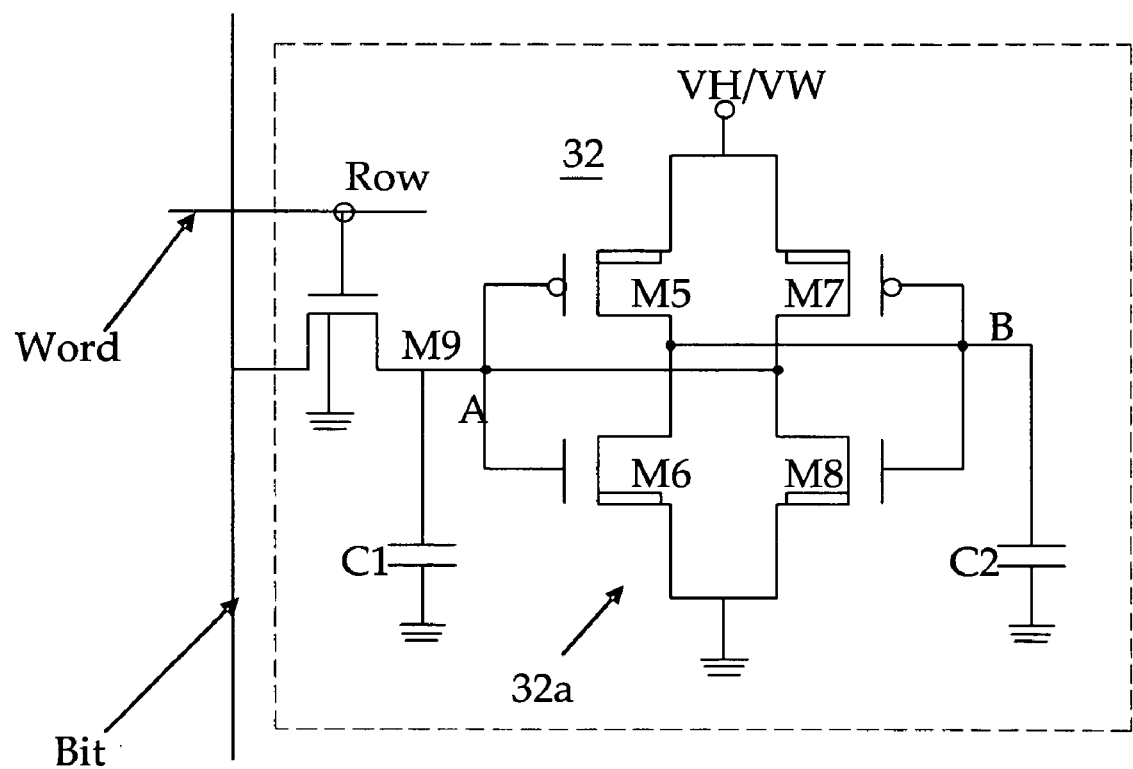
FIG. 1C is a conceptual diagram showing the configuration of the drive circuit of a mirror element of the projection apparatus according to a conventional technique.
Figure 1D:
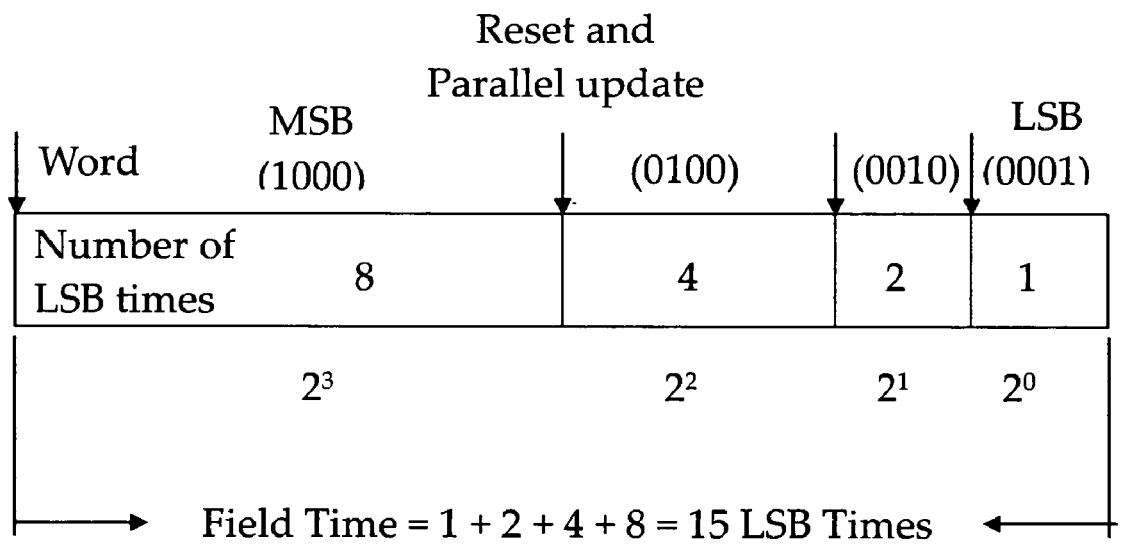
FIG. 1D is a conceptual diagram showing the format of image data used in the projection apparatus according to a conventional technique.
Figure 1E:
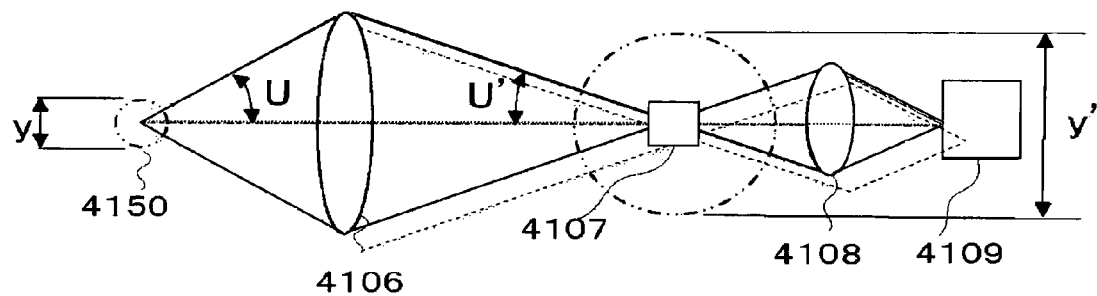
FIG. 1E is an illustrative diagram for describing etendue by exemplifying the case of using a discharge lamp light source and projecting an image by way of an optical device.

FIG. 1E is an illustrative diagram for showing etendue by exemplifying the case of using a discharge lamp light source and projecting an image by way of an optical device.

[Outline of the Device]

The first is a description of a mirror device.

Projection apparatuses each generally using a spatial light modulator, such as a transmissive liquid crystal, a reflective liquid crystal, a mirror array and the like, are widely known.

A spatial light modulator is formed as a two-dimensional array arranging from tens of thousands to millions of miniature modulation elements, with the individual elements enlarged and displayed, as the individual pixels corresponding to an image to be displayed, onto a screen by way of a projection lens.

The spatial light modulators generally used for projection apparatuses primarily include two types, i.e., a liquid crystal device for modulating the polarizing direction of incident light by sealing a liquid crystal between transparent substrates and providing them with a potential, and a mirror device deflecting miniature micro electro mechanical systems (MEMS) mirrors with electrostatic force and controlling the reflecting direction of illumination light.

One embodiment of the above described mirror device is disclosed in U.S. Pat. No. 4,229,732, in which a drive circuit using MOSFET and deflectable metallic mirrors are formed on a semiconductor wafer substrate. The mirror allows to be deformed by electrostatic force supplied from the drive circuit and is capable of changing the reflecting direction of the incident light.

Meanwhile, U.S. Pat. No. 4,662,746 has disclosed an embodiment in which one or two elastic hinges retain a mirror. If the mirror is retained by one elastic hinge, the elastic hinge functions as bending spring. If the mirror is retained by two elastic hinges, they function as torsion springs to incline the mirror and thereby the reflecting direction of the incident light is deflected.

As described above, the on-and-off states of micromirror control scheme as that implemented in the U.S. Pat. No. 5,214,420 and by most of the conventional display system imposes a limitation on the quality of the display. Specifically, when applying conventional configuration of control circuit has a limitation that the gray scale of conventional system (PWM between ON and OFF states) is limited by the LSB (least significant bit, or the least pulse width). Due to the On-Off states implemented in the conventional systems, there is no way to provide shorter pulse width than LSB. The least brightness, which determines gray scale, is the light reflected during the least pulse width. The limited gray scales lead to degradations of image display.

Specifically, in FIG. 1C an exemplary circuit diagram of a prior art control circuit for a micromirror according to U.S. Pat. No. 5,285,407. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a wordline. Latch 32a is formed from two cross-coupled inverters, M5/M6 and M7/M8, which permit two stable states. State 1 is Node A high and Node B low and state 2 is Node A low and Node B high.

The mirror driven by a drive electrode abuts on a landing electrode structured differently from the drive electrode, and thereby a prescribed tilt angle is maintained. A "landing chip", which possesses a spring property, is formed on the contact part abutting on the landing electrode so that an operation of the mirror deflecting to the reverse direction upon changing over the control is assisted. The part forming the landing chip and the landing electrode are maintained at the same potential so that the contact will not cause a shorting or the like.

[Outline of PWM Control]

Next is an outline of a pulse-width modulation (PWM) control.

As described above, the dual states switching as illustrated by the control circuit controls the micromirrors to position either at an ON of an OFF angular orientation as that shown in FIG. 1A. The brightness, i.e., the gray scales of display for a digitally control image system is determined by the length of time the micromirror stays at an ON position. The length of time a micromirror is controlled at an ON position is in turned controlled by a multiple bit word. For simplicity of illustration, FIG. 1D shows the "binary time intervals" when control by a four-bit word. As that shown in FIG. 1D, the time durations have relative values of 1, 2, 4, 8 that in turn define the relative brightness for each of the four bits where 1 is for the least significant bit and 8 is for the most significant bit. According to the control mechanism as shown, the minimum controllable differences between gray scales for showing different brightness is a brightness represented by a "least significant bit" that maintaining the micromirror at an ON position.

In a simple example, and assuming n bits of gray scales, the frame time is divided into $(2^n-1)$ equal time slices. For a 16.7 milliseconds frame period and n-bit intensity values, the time slice is $16.7/(2^n-1)$ milliseconds Having established these times, for each pixel of each frame, pixel intensities are quantized, such that black is 0 time slices, the intensity level represented by the LSB is 1 time slice, and maximum brightness is 15 time slices (in the case of n=4). Each pixel's quantized intensity determines its on-time during a frame period. Thus, during a frame period, each pixel with a quantized value of more than 0 is on for the number of time slices that correspond to its intensity. The viewer's eye integrates the pixel brightness so that the image appears the same as if it were generated with analog levels of light.

For addressing deformable mirror devices, PWM calls for the data to be formatted into "bit-planes", each bit-plane corresponding to a bit weight of the intensity value. Thus, if each pixel's intensity is represented by an n-bit value, each frame of data has n bit-planes. Each bit-plane has a 0 or 1 value for each display element. In the PWM example described in the preceding paragraphs, during a frame, each bit-plane is separately loaded and the display elements are addressed according to their associated bit-plane values. For example, the bit-plane representing the LSBs of each pixel is displayed for 1 time slice.

[Outlines of Mirror Size and Resolution]

Next is an outline description of the size of a mirror and the resolution.

The size of a mirror for constituting such a mirror device is between 4 μm and 20 μm for each side, and the mirrors are placed on a semiconductor wafer substrate in such a manner as to minimize the gap between adjacent mirrors so that useless reflection light from the gap does not degrade the contrast of a demodulated image. One mirror device is constituted by forming on a substrate an appropriate number of mirror elements, as image display elements, comprising these mirrors. Here, the appropriate number as image display elements are the numbers, for example, in compliance to the resolution of a display specified by the Video Electronics Standards Association (VESA) and to the television forecasting standard. Here, in the case of configuring a mirror device comprising the number of mirror elements, which is compliant to the WXGA (with the resolution of 1280×768) specified by the VESA and in which the size of each mirror is 10 μm, a sufficiently miniature mirror device is configured, with about 0.61 inches of the diagonal length of the display area.

[Outline of Projection Apparatus]

Next is an outline description of the configuration of a projection apparatus.

The projection apparatuses using deflection-type ("deflectable") light modulators are primarily categorized into two types, i.e., a single-panel projection apparatus comprising a single spatial light modulator, changing spatially the frequency of a projection light and displaying an image in colors, and a multi-panel projection apparatus comprising a plurality of spatial light modulators, modulating an illumination light with different frequencies constantly by means of the individual spatial light modulators and displaying an image in colors by synthesizing these modulated lights.

The single-panel projection apparatus is constituted as described above by referring to FIG. 1A.

[Outline of the Introduction of Laser Light Source]

Next is an outline description of the introduction of a laser light source.

Figure 2:
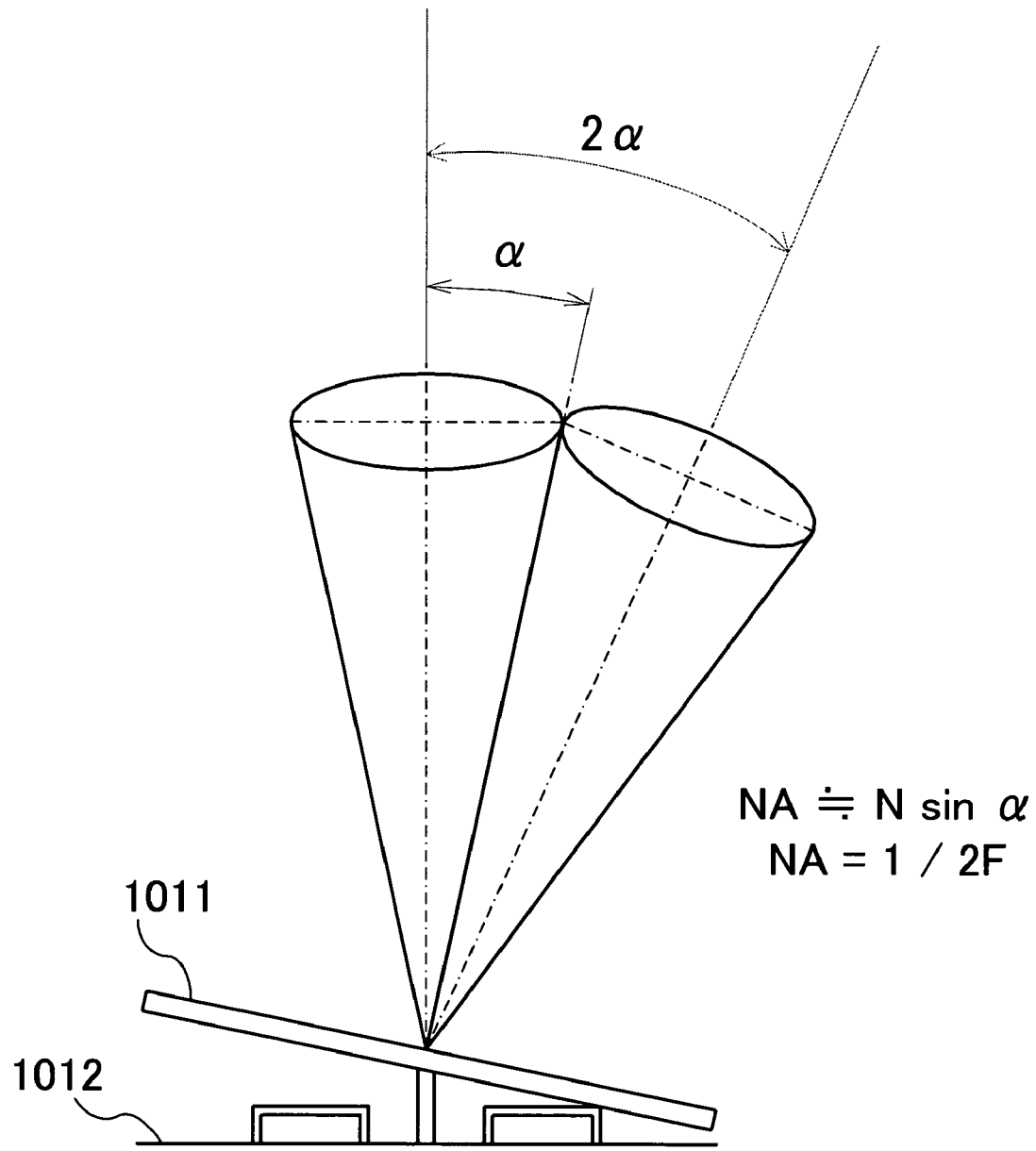
FIG. 2 is a diagram showing the relationship among the numerical aperture NA1 of an illumination light path, the numerical aperture NA2 of a projection light path and the tilt angle α of a mirror.

In the projection apparatus comprising a reflective spatial light modulator represented by the above described mirror, there is a close relationship among the numerical aperture (NA) NA1 of an illumination light path, the numerical aperture NA2 of a projection light path and the tilt angle α of a mirror. FIG. 2 shows the relationship among them.

Let it be assumed that the tilt angle α of a mirror 1011 as 12 degrees. When a modulated light reflected by the mirror 1011 and incident to the pupil of the projection light path is set at the perpendicular direction of a device substrate 1012, the illumination light is incident from a direction inclined by 2α, that is, 24 degrees, relative to the perpendicular of the device substrate 1012. For the light beam reflected by the mirror to be most efficiently incident to the pupil of the projection lens, the numerical aperture of the projection light path is desirably equal to the numerical aperture of the illumination light path. If the numerical aperture of the projection light path is smaller than that of the illumination light path, the illumination light cannot be sufficiently imported into the projection light path, while if the numerical aperture of the projection light path is larger that that of the illumination light path, the illumination light can be entirely imported; the projection lens becomes unnecessarily large, bringing about inconvenience in terms of configuring the projection apparatus. Further in this event, the light fluxes of the illumination light and projection light need to be basically placed apart from each other because the optical members of the illumination system and those of the projection system need to be physically placed respectively. From the above considerations, when a spatial light modulator with the tilt angle of a mirror being 12 degrees is used, the numerical aperture (NA) NA1 of the illumination light path and the numerical aperture NA2 of the projection light path are preferred to be set as follows:

$$NA1=NA2=\sin\alpha=\sin 12°$$

Letting the F number of the illumination light path be F1 and the F number of the projection light path be F2, then the numerical aperture can be converted into an F number as follows:

$$F1=F2=1/(2*NA)=1/(2*\sin 12°)=2.4$$

In order to maximize the importation of illumination light emitted from a light source possessing non-directivity in the emission direction of light, such as a high-pressure mercury lamp and xenon lamp, which are generally used for a projection apparatus, there is a requirement for maximizing the importing angle of light on the illumination light path side. Considering that the numerical aperture of the illumination light path is determined by the specification of the tilt angle of a mirror to be used, it is clear that the tilt angle of the mirror needs to be large for increasing the numerical aperture of the illumination light path.

However, there is a problem that the increasing of the tilt angle of mirror requires a higher drive voltage for driving the mirror.

Because greater tilt angle of the mirror requires a physical space for tilting the mirror, a greater distance needs to be secured between the mirror and an electrode for driving the mirror. The electrostatic force F generated between the mirror and the electrode is given by the following expression:

$$F=(\epsilon*S*V^2)/(2*d^2),$$

where "S" is the area size of the electrode, "V" is a voltage, "d" is the distance between the electrode and mirror and "ε" is the permittivity of vacuum.

The expression makes it comprehensible that the drive force is decreased in proportion to the second power of the distance d between the electrode and mirror. It is conceivable to increase the drive voltage for compensating the decrease in the drive force associated with the increase in the distance; conventionally, however, the drive voltage is about 3 to 15 volts in the drive circuit by means of a CMOS process used for driving a mirror and therefore a relatively special process such as a DMOS process is required if a drive voltage in excess of about 15 volts is needed. That is not preferable in view of the purchase of a mirror device and the cost reduction.

Further, as for a cost reduction of a mirror device, it is desirable to obtain as many mirror devices as possible from a single semiconductor wafer substrate in view of the improvement of productivity. That is, a miniaturization of the size of mirror elements reduces the size of the mirror device per se. It is clear that the area size of an electrode is reduced in association with the miniaturization of the mirror, which also leads to less driving power.

Furthermore, in contrast to the requirement for miniaturizing a mirror device, there is a problem in which the larger a mirror device, the brighter is it possible to illuminate as long as a conventional lamp is used because a conventional lamp with a non-directivity in its emission allows the usage efficiency of light to be substantially reduced. This is attributable to a relationship commonly called etendue.

As shown in FIG. 1E above, where "y" is the size of a light source, "u" is the importing angle of light on the light source side, "y#" is the size of the image of a light source, and "u'" is the converging angle on the image side, the relationship among these is represented by the following expression:

$$y*u=y'*u'$$

That is, the smaller the device on which a light source is intended to be imaged, the smaller the importing angle on the light source side becomes. This is why it is advantageous to use a laser light source, of which the emission light possesses strong directivity, for miniaturizing a mirror device. Note that in FIG. 1E above, numerical symbol 4150 denotes the light source, the numerical symbol 4106 denotes the illumination lens, the numerical symbol 4107 denotes the device, the numerical symbol 4108 denotes the projection lens, and the numerical symbol 4109 denotes the projected image.

[Outline of Resolution Limit]

Next is an outline description of a resolution limit.

An examination of the limit value of the aperture ratio of a projection lens used for a projection apparatus, which displays the display surface of a spatial light modulator in enlargement, in view of the resolution of an image to be projected, leads to the following.

Where "Rp" is the pixel size of the spatial light modulator, "NA" is the aperture ratio of a projection lens, "F" is an F number and "λ" is the wavelength of light, the limitative "Rp" with which any adjacent pixels on the projection surface are separately observed is given by the following expression:

$$Rp=0.61*\lambda/NA=1.22*\lambda*F$$

The table below shows the F value of a projection lens and deflection angle of a mirror when the size of adjacent mirror elements is shortened by miniaturizing the mirror elements, with the wavelength of light beam designated at λ=650 nm that is the worst condition within the range of visible light. Meanwhile, the F value of a projection lens with the wavelength designated at 700 nm is about 7% smaller than the case of calculating the F value for the wavelength of 650 nm.

| Pixel size of mirror device [μm] | F number of projection lens | Deflection angle of mirror [degrees] |
|---|---|---|
| 4 | 5.04 | 5.69 |
| 5 | 6.30 | 4.55 |
| 6 | 7.56 | 3.79 |
| 7 | 8.82 | 3.24 |
| 8 | 10.08 | 2.84 |
| 9 | 11.34 | 2.52 |
| 10 | 12.61 | 2.27 |
| 11 | 13.87 | 2.06 |

Therefore, if the problem related to the above described etendue is avoided by using a laser light for the light source, the F numbers of lenses for the illumination system and projection system can be increased to the values shown in the table, making it possible to decrease the deflection angle of the mirror element and thereby a miniature mirror device with a low drive voltage can be configured.

[Outline of Oscillation Control]

Next is an outline description of an oscillation control.

As another method for reducing a drive voltage, other than the method for minimizing the tilt angle of a mirror, there is a technique disclosed in US Patent Application 20050190429. In this disclosure, a mirror is put to a free oscillation in the inherent oscillation frequency, and thereby the intensity of light that is about 25% to 37% of the emission light intensity when a mirror is controlled under a constant ON can be obtained during the oscillation period of the mirror.

According to such a control, there is no particular need to drive the mirror in high speed, making it possible to obtain a high level of gray scale with a low spring constant of a spring member supporting the mirror, and therefore enabling a reduction in the drive voltage. Furthermore, a combination with the method of decreasing the drive voltage by decreasing the deflection angle of a mirror as described above brings forth a greater deal of effect.

As described above, the use of a laser light source makes it possible to decrease the deflection angle of a mirror and also miniaturize the mirror device without ushering in a degradation of brightness, and further, the use of the above described oscillation control enables a higher level of gray scale without causing an increase in the drive voltage.

There is, however, the problem of degrading the efficiency of space usage of an electrode if an electrode for driving a mirror and a stopper for determining the deflection angle of the mirror are individually configured as in the conventional method.

U.S. Pat. No. 5,583,688, US Patent 20060152690, U.S. Pat. No. 6,198,180, and U.S. Pat. No. 6,992,810 disclose configurations for determining a deflection angle of a mirror in a conventional mirror device. However, in any of the above disclosed configurations, it is difficult to increase the size of address electrodes.

In consideration of the problems noted above, the preferred embodiment 1-1 of the present invention is accordingly configured to integrally form an electrode used for driving a mirror element and a stopper used for determining the deflection angle of a mirror, in a mirror device.

The following is a description, in detail, of a mirror device according to the present embodiment.

Figure 3A:
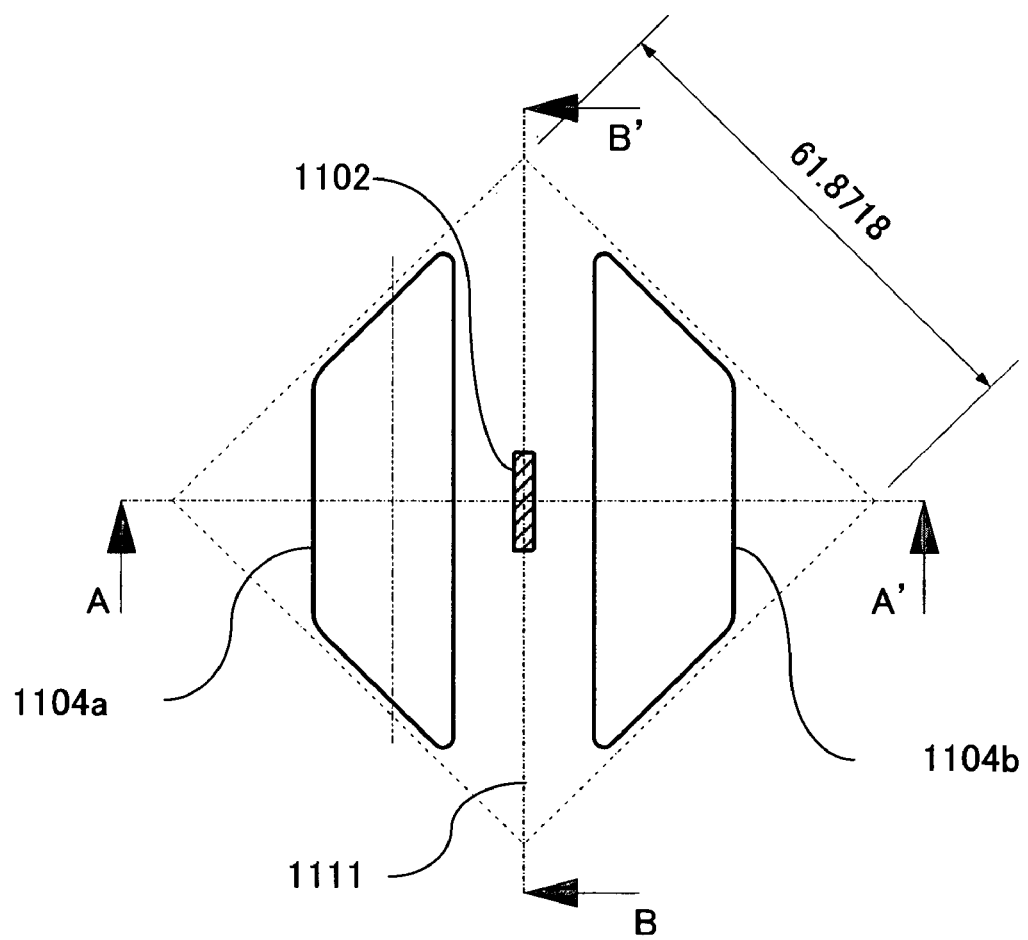
FIG. 3A is a plan cross-sectional view exemplifying a configuration example of a mirror device according to a preferred embodiment 1-1.
Figure 3B:
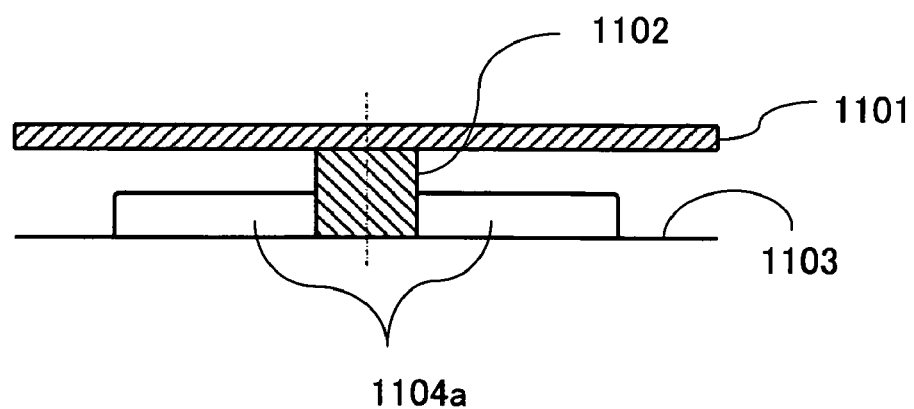
FIG. 3B is a cross-sectional view of a part along line B-B' in a configuration example of a mirror element in the mirror device shown in FIG. 3A according to a preferred embodiment 1-1.
Figure 3C:
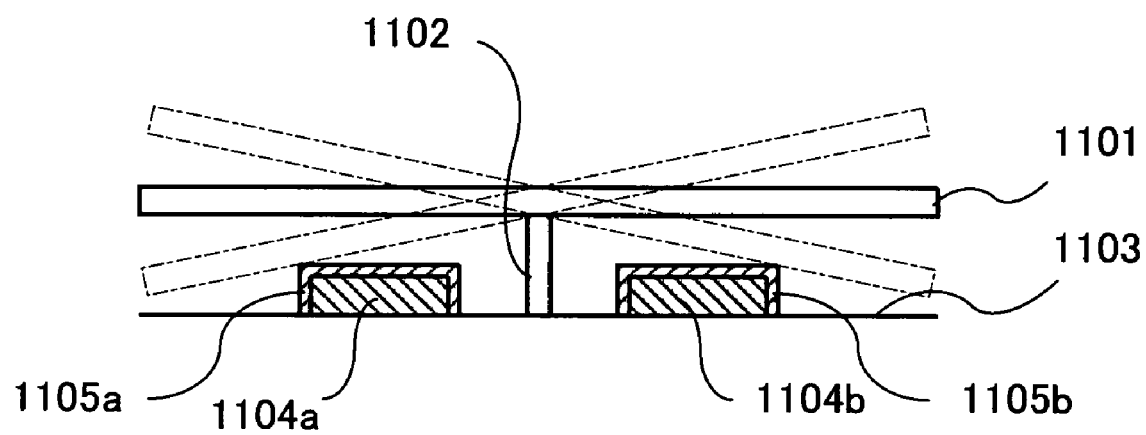
FIG. 3C is a cross-sectional view of a part along line A-A' in a configuration example of the mirror element in the mirror device shown in FIG. 3A according to a preferred embodiment 1-1.

FIG. 3A is a horizontal cross-sectional diagram exemplifying the configuration of the mirror element of a mirror device according to the preferred embodiment 1-1. FIG. 3B is a side cross-sectional diagram exemplifying the configuration of the mirror element of the mirror device according to the preferred embodiment 1-1. FIG. 3C is another side cross-sectional diagram showing the configuration of the mirror element of the mirror device according to the preferred embodiment of 1-1.

In the mirror element shown in FIG. 3, a mirror 1101 made of a high reflectance material such as aluminum and gold is supported by an elastic hinge 1102 made of a silicon material, a metallic material and the like, and is placed on a substrate member 1103. Here, the silicon material comprehends polysilicon, single crystal silicon and amorphous silicon, while the metallic material comprehends aluminum, titanium and an alloy of some of these metallic materials, or a composite material of them. The mirror 1101 has the form of approximate square, with the length of one side, for example, between 4 µm and 11 µm. The size of adjacent mirrors is between, for example, 4 µm and 11 µm. The deflection axis 1111 of the mirror 1101 is on the diagonal line. The lower end of the elastic hinge 1102 is connected to the substrate member 1103 that includes a circuit for driving the mirror 1101. The upper end of the elastic hinge 1102 is connected to the bottom surface of the mirror 1101. For example, an electrode for securing an electrical continuity and an intermediate member for improving the strength of a member and improving the strength of connection may be placed between the elastic hinge 1102 and substrate member 1103, or between the elastic hinge 1102 and mirror 1101.

In FIGS. 3A through 3C, electrodes 1104 (i.e., 1104a and 1104b) used for driving the mirror 1101 are placed on the top surface of the substrate member 1103 so as to be opposite to the bottom surface of the mirror 1101. The form of the electrode 1104 may be symmetrical or asymmetrical about the deflection axis 1111. The electrode 1104 is made of aluminum or tungsten. The present embodiment is configured such that the electrode 1104 fills the function of a stopper for determining the deflection angle of the mirror. The deflection angle of the mirror is the angle determined by the aperture ratio of a projection lens that satisfies a theoretical resolution determined by the size of adjacent mirrors on the basis of the expression described above:

$$Rp = 0.61 * \lambda / NA = 1.22 * \lambda * F$$

Alternatively, it may be changed to an angle larger than the determined angle. As an example, the deflection angle of mirror is between 10 degrees and 14 degrees relative to the horizontal state of the mirror 1101 or between 2 degrees and 10 degrees relative to the horizontal state of the mirror 1101. The configuring of the electrode 1104 also functioning as stopper makes it possible to maximize an electrode layout space than the conventional case of placing the electrode and stopper individually, when the mirror element is miniaturized.

The form of the electrode is configured, as shown in FIGS. 3A through 3C, to be a trapezoid constituted by the top side and bottom side, which are approximately parallel to the deflection axis 1111 and sloped sides approximately parallel to the contour line of the mirror 1101 of the mirror device in which the deflection axis of the mirror 1101 is matched with the diagonal line thereof. The electrode and stopper are not individually formed as the conventional method, and therefore such a form is available.

A difference in potentials needs to be generated between the mirror and electrode for driving the mirror by electrostatic force. The present embodiment using the electrode also as stopper is configured to provide the surface of the electrode or/and the rear surface of the mirror with an insulation layer (s) in order to prevent an electrical shorting at the mirror contacting with the electrode. Further, in the case of providing the surface of the electrode with an insulation layer, the configuration may also be such that the insulation layer is provided to only a part including the contact part with the mirror. FIGS. 3A through 3C exemplify the case of providing the surface of the electrode 1104 (i.e., 1104a and 1104b) with an insulation layer 1105 (i.e., 1105a and 1105b). The insulation layer is made of oxidized compound, azotized compound, silicon or silicon compound, e.g., SiC, $SiO_2$, $Al_2O_3$, and Si. The material and thickness of the insulation layer is determined so that the dielectric strength voltage is maintained at no less than the voltage required to drive the mirror, most preferably no less than 5 volts. For example, the dielectric strength voltage may be configured to be two times the drive voltage of the mirror or higher, 3 volts or higher or 10 volts or higher.

Next is a description of one example related to the size and form of an electrode.

Figure 4:
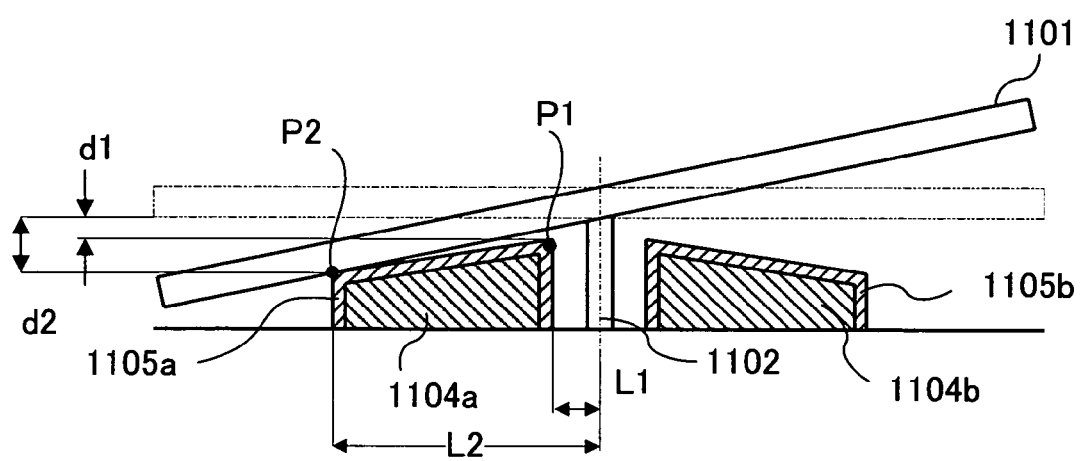
FIG. 4 shows another configuration example of an electrode.

Referring to FIG. 4, where "L1" is the distance between the deflection axis and the edge of the electrode on a side closer to the deflection axis of the mirror 1101, "L2" is the distance between the deflection axis and the edge of the electrode on a side far from the deflection axis of the mirror 1101, and "d1" and "d2" are the distance between the mirror bottom surface and electrode at the respective edges. Now for a description, "P1" is a representative point at the electrode edge on the side closer to the deflection axis of the mirror and "P2" is a representative point at the electrode edge on the side far from the deflection axis of the mirror.

The example shown in FIG. 4 is the case in which the electrode is formed so as to constitute: d1<d2. In this configuration, the stopper determining the tilt angle of the mirror 1101 is preferred to be placed at the point P2 in consideration of a production variance of the electrode height that influences the deflection angle of the mirror. The present embodiment is accordingly configured to satisfy the relationship of:

$$d1 > (L1 * d2)/L2$$

This configuration provides a good usage efficiency of the space under the mirror and maintains a stable deflection angle of the mirror.

Further, in the case of configuring the electrode to constitute d1=d2, the point on the electrode determining the deflection angle of the mirror is P2 and the configuration is determined to satisfy the following expression:

$$\cot \theta = d2/L2$$

Next is an outline description of the circuit comprisal of the mirror device according to the present embodiment.

The circuit comprisal of the mirror device according to the present embodiment is exemplified in FIGS. 12 and 14, both of which are described later, and therefore the description is not provided here.

Figure 5A:
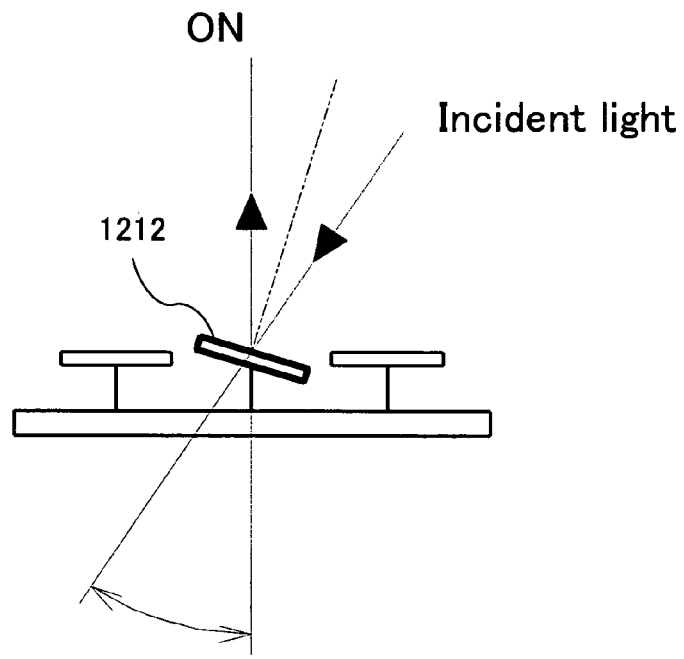
Figure 5C:
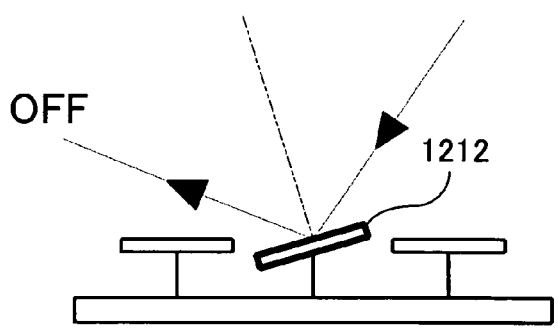
FIG. 5C is another side view diagram showing an example of the deflection state when the mirror is OFF.
Figure 5B:
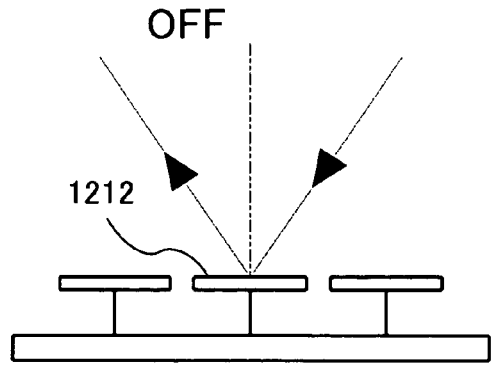
FIG. 5B is a side view diagram showing an example of a deflection state when the mirror is OFF.

Such configuration and operation cause the deflection states of the mirror to change on the basis of the voltage applied to the electrode in each mirror element of a mirror array and thereby the light incident to the mirror 1212 is deflected to the specific direction as shown in FIGS. 5A through 5C as an example.

Next is an outline description of the natural oscillation frequency of the oscillation system of a mirror device according to the present embodiment.

The fact that a drive voltage can be lowered by obtaining a fine gray scale by means of a free oscillation of a mirror is already described above. Now, if an LSB light intensity by way of a common PWM drive is intended to be obtained by an oscillation, the natural oscillation cycle of an oscillation system that includes an elastic hinge is designated as follows:

The natural oscillation cycle T of an oscillation system=$2*\pi*\sqrt{(I/K)}$=LSB time/X [%];
where:
 I: the rotation moment of an oscillation system,
 K: the spring constant of an elastic hinge,
 LSB time: the LSB cycle at displaying n bits, and
 X [%]: the ratio of the light intensity obtained by one oscillation cycle to the Full-ON light intensity of the same cycle
Note that:
 "I" is determined by the weight of a mirror and the distance between the center of gravity and the center of rotation;
 "K" is determined from the thickness, width, length and cross-sectional shape of an elastic hinge;
 "LSB time" is determined from one frame time, or one frame time and the number of reproduction bits in the case of a single-panel projection method;
 "X" is determined as the above description, particularly from the F number of a projection lens and the intensity distribution of an illumination light.

As an example, when a single-panel color sequential method is employed, the ratio of emission intensity by one oscillation is assumed to be 32% and the minimum emission intensity in a 10-bit grayscale is desired to be obtained by an oscillation, then "I" and "K" are designed so as to have a natural oscillation cycle as follows:

$$T = 1/(60 * 3 * 2^{10} * 0.32) \approx 17.0 \ \mu\text{sec}.$$

In contrast, when a conventional PWM control is employed to make the changeover transition time $t_M$ of a mirror approximately equal to the natural oscillation frequency of the oscillation system of the mirror and also the LSB is regulated so that a shortage of the light intensity in the interim can be sufficiently ignored, the gray scale reproducible with the above described hinge is about 8-bit even if the LSB is set at five times the changeover transition time $t_M$. That is, it is comprehensible that a 10-bit grayscale can be reproduced by using the elastic hinge that would have made it possible to reproduce about an 8-bit grayscale according to the conventional control.

In the single-panel projection apparatus described above, an example configuration attempting to obtain, for example, 13-bit grayscale is as follows:

$$\text{LSB time} = (1/60) * (1/3) * (1/2^{13}) = 0.68 \ \mu\text{sec}$$

If a configuration is such that the light intensity obtained in one cycle for the optical comprisal is 38% of the intensity of the case controlling a mirror under a constant ON for the same cycle, the oscillation cycle T is as follows:

$$T = 0.68/38\% = 1.8 \ \mu\text{sec}$$

In contrast, when an 8-bit grayscale is attempted to be obtained in the multi-panel projection apparatus described above, an example comprisal is as follows:

$$\text{LSB time} = (1/60) * (1/3) * (1/2^8) = 21.7 \ \mu\text{sec}$$

If a configuration is such that the light intensity obtained in one cycle for the optical comprisal is 20% of the case controlling a mirror under a constant ON for the same cycle, the oscillation cycle T is as follows:

$$T = 21.7/20\% = 108.5 \ \mu\text{sec}.$$

As described above, the present embodiment is configured to set the natural oscillation cycle of the oscillation system, which includes an elastic hinge, between about 1.8 μsec and 108.5 μsec; and to use three deflection state, i.e., a first deflection state, in which the light modulated by the mirror element is headed to the projection light path, a second deflection state, in which the light is headed to elsewhere other than the projection light path, and a third deflection state, in which the mirror oscillates between the first and second deflection states, thereby enabling the display of a high gray scale image without increasing the drive voltage of the mirror element.

As described above, the present embodiment is configured to make the electrode also function as stopper regulating the deflection angle of the mirror, thereby making it possible to improve a space usage efficiency, when the mirror element is miniaturized, and expand the area of the electrode.

Disclosure Content 2

The following is a description, in detail, of the preferred embodiment of the present invention by referring to the accompanying drawings.

Figure 6:
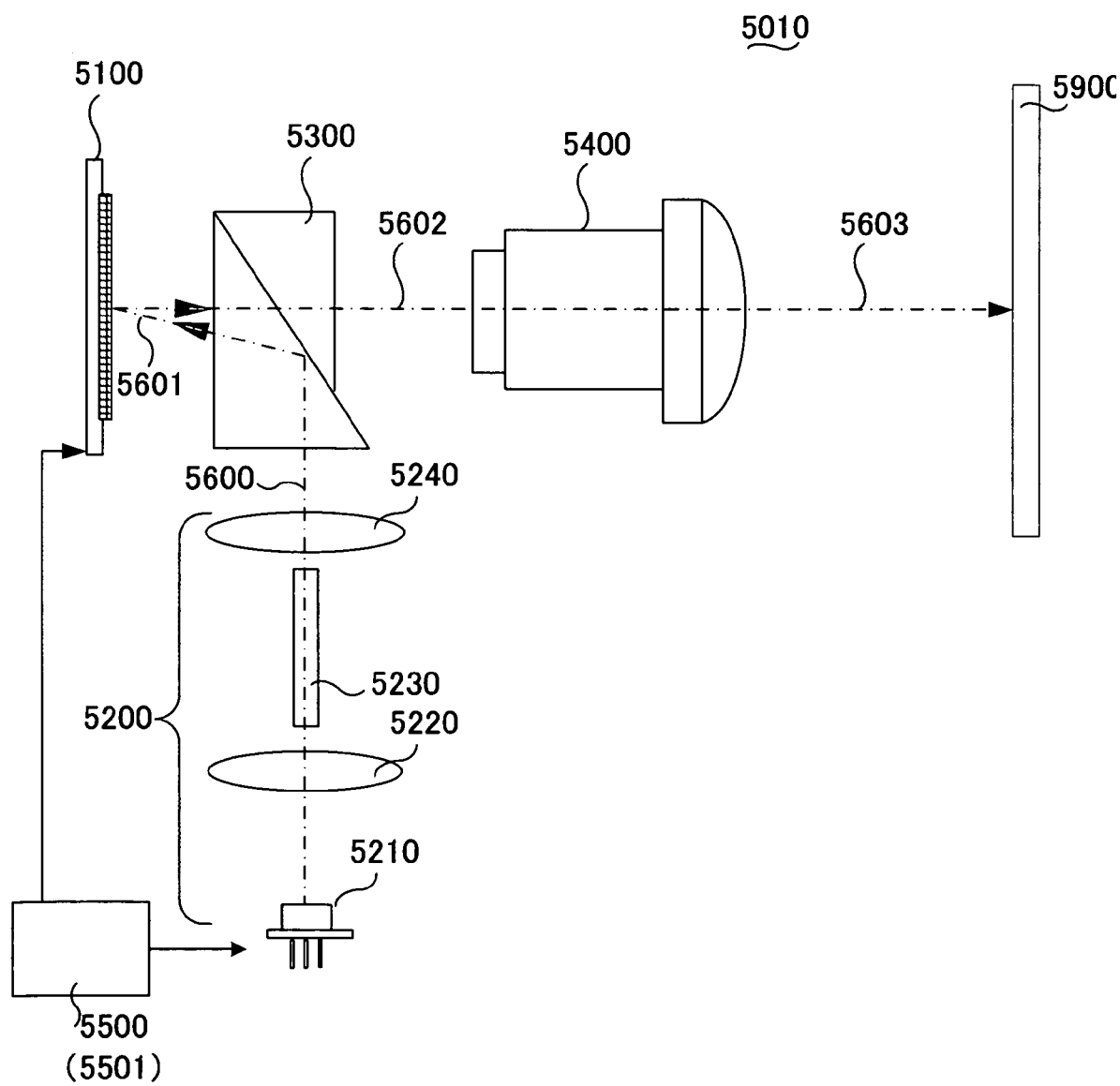
FIG. 6 is a conceptual diagram showing the configuration of a projection apparatus according to a preferred embodiment of the present invention.

FIG. 6 is a conceptual diagram showing the configuration of a projection apparatus according to a preferred embodiment of the present invention.

A projection apparatus 5010 according to the present embodiment comprises a single spatial light modulator (SLM) 5100, a control unit 5500, a Total Internal Reflection (TIR) prism 5300, a projection optical system 5400 and a light source optical system 5200 as exemplified in FIG. 6.

The projection apparatus 5010 is a so-called single-panel projection apparatus 5010 comprising a single spatial light modulator 5100.

The projection optical system 5400 is equipped with the spatial light modulator 5100 and TIR prism 5300 in the optical axis of the projection optical system 5400, and the light source optical system 5200 is equipped in such a manner that the optical axis thereof matches that of the projection optical system 5400.

The TIR prism 5300 fills the function of making an illumination light 5600, which is incoming from the light source optical system 5200 placed onto the side, enter the spatial light modulator 5100 at a prescribed inclination angle relative thereto as incident light 5601 and making a reflection light 5602 reflected by the spatial light modulator 5100 transmit so as to reach the projection optical system 5400.

The projection optical system 5400 projects the reflection light 5602 incoming by way of the spatial light modulator 5100 and TIR prism 5300 to a screen 5900 and such, as projection light 5603.

The light source optical system 5200 comprises a variable light source 5210 for generating the illumination light 5600, a condenser lens 5220 for focusing the illumination light 5600, a rod type condenser body 5230 and a condenser lens 5240.

The variable light source 5210, condenser lens 5220, rod type condenser body 5230 and condenser lens 5240 are sequentially placed in the aforementioned order in the optical axis of the illumination light 5600 emitted from the variable light source 5210 and incident to the side face of the TIR prism 5300.

The projection apparatus 5010 employs a single spatial light modulator 5100 for implementing a color display on the screen 5900 by means of a sequential color display method.

That is, the variable light source 5210, comprising a red laser light source 5211, a green laser light source 5212 and a blue laser light source 5213 (which are not shown in a drawing here) that allows independent controls for the light emission states, performs the operation of dividing one frame of display data into a plurality of sub-fields (i.e., three sub-fields, that is, red (R), green (G) and blue (B) in the present case) and making each of the red laser light source 5211, green laser light source 5212 and blue laser light source 5213 emit each respective light in time series at the time band corresponding to the sub-field of each color as described later. The light sources are laser light sources in the example, but they may be semiconductor light sources such as LEDs.

Figure 7:
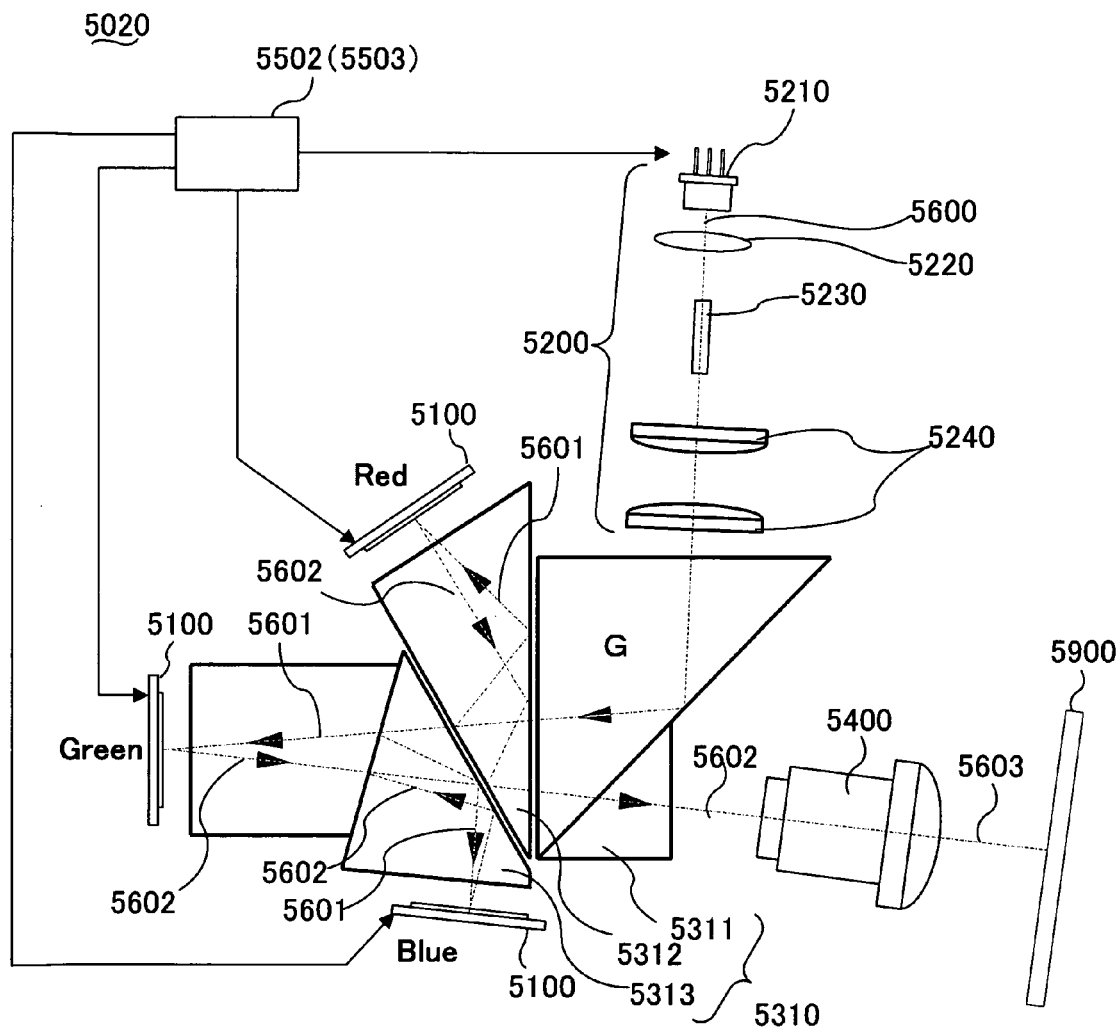
FIG. 7 is a conceptual diagram showing the configuration of a single-panel projection apparatus according to another preferred embodiment of the present invention.

FIG. 7 is a conceptual diagram showing the configuration of a projection apparatus according to another preferred embodiment of the present invention.

The projection apparatus 5020 is a so-called multiple-plate projection apparatus comprising a plurality of spatial light modulators 5100, which is the difference from the above described projection apparatus 5010. Further, the projection apparatus 5020 comprises a control unit 5502 in place of the control unit 5500.

The projection apparatus 5020 comprises a plurality of spatial light modulators 5100, and is equipped with a light separation/synthesis optical system 5310 between the projection optical system 5400 and each of the spatial light modulators 5100.

The light separation/synthesis optical system 5310 comprises a plurality of TIR prisms, i.e., a TIR prism 5311, a prism 5312, and a prism 5313.

The TIR prism 5311 has the function of leading the illumination light 5600 incident from the side of the optical axis of the projection optical system 5400 to the spatial light modulator 5100 as incident light 5601.

The TIR prism 5312 has the functions of separating red (R) light from an incident light 5601 incident by way of the TIR prism 5311 and making the red light incident to the red light-use spatial light modulators 5100, and the function of leading the reflection light 5602 of the red light to the TIR prism 5311.

Likewise, the prism 5313 has the functions of separating blue (B) and green (G) lights from the incident light 5601 incident by way of the TIR prism 5311 and making them incident to the blue color-use spatial light modulators 5100 and green color-use spatial light modulators 5100, and the function of leading the reflection light 5602 of the green light and blue light to the TIR prism 5311.

Therefore, the spatial light modulations of three colors of R, G and B are simultaneously performed at three spatial light modulators 5100, respectively, and the reflection light 5602 resulting the respective modulations are projected onto the screen 5900 as the projection light 5603 by way of the projection optical system 5400, and thus a color display is carried out.

Note that various modifications are conceivable for a light separation/synthesis optical system, in lieu of being limited to the light separation/synthesis optical system 5310.

Figure 8A:
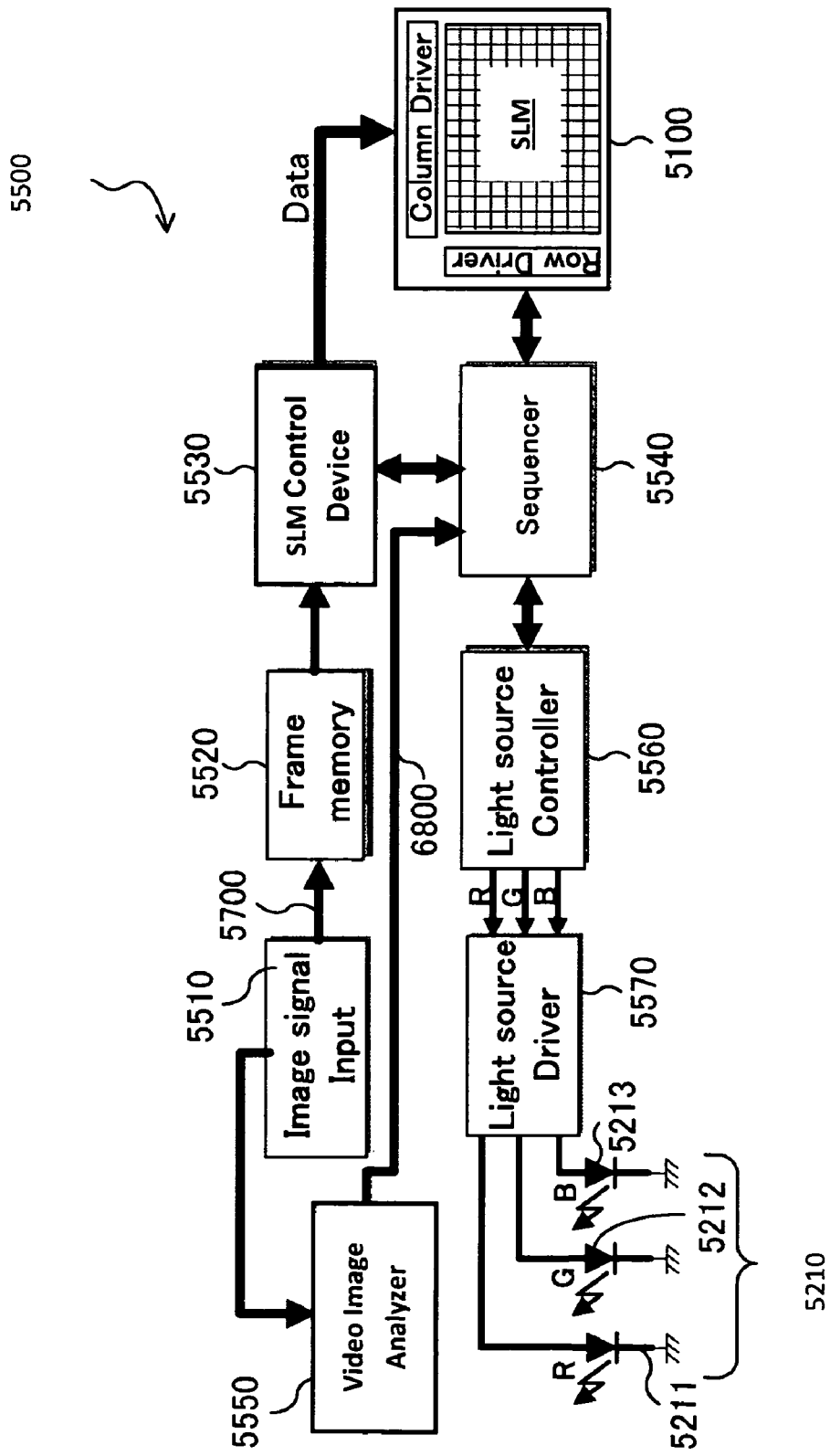
FIG. 8A is a block diagram showing the configuration of a control unit provided to a single-panel projection apparatus according to a preferred embodiment of the present invention.

FIG. 8A is a block diagram exemplifying the configuration of the control unit 5500 comprised in the above described single-panel projection apparatus 5010. The control unit 5500 comprises a frame memory 5520, an SLM controller 5530, a sequencer 5540, a light source control unit 5560 and a light source drive circuit 5570.

The sequencer 5540, constituted by a microprocessor and the like, controls the operation timing and the like of the entirety of the control unit 5500 and spatial light modulators 5100.

The frame memory 5520 retains the amount of, for example, one frame of input digital video data 5700 incoming from an external device (not shown in a drawing herein), which is connected to a video signal input unit 5510. The input digital video data 5700 is updated, moment by moment, every time the display of one frame is completed.

The SLM controller 5530 processes the input digital video data 5700 read from the frame memory 5520 as described later, separates the read data into a plurality of sub-fields 5701 through 5703, and outputs them to the spatial light modulators 5100 as binary data 5704 and non-binary data 5705, which are used for implementing an the ON/OFF control and oscillation control (which are described later) of a mirror 5112 of the spatial light modulator 5100.

The sequencer 5540 outputs a timing signal to the spatial light modulators 5100 synchronously with the generation of the binary data 5704 and non-binary data 5705 at the SLM controller 5530.

The video image analysis unit 5550 outputs a image analysis signal 5800 used for generating various light source pulse patterns (which are described later) on the basis of the input digital video data 5700 inputted from the video signal input unit 5510.

The light source control unit 5560 controls, by way of the light source drive circuit 5570, the operation of the variable light source 5210 emitting the illumination light 5600 by using a light source profile control signal, which is generated from the image analysis signal 5800 on the basis of the input of the image analysis signal 5800 obtained from the video image analysis unit 5550 by way of the sequencer 5540 and which generates light source pulse patterns 5801 through 5811 (which are described later).

The light source drive circuit 5570 performs the operation of driving the red laser light source 5211, green laser light source 5212 and blue laser light source 5213 of the variable light source 5210 to emit light, respectively, so as to generate the light source pulse patterns 5801 through 5811 (which are described later), which are input from the light source control unit 5560.

Figure 8B:
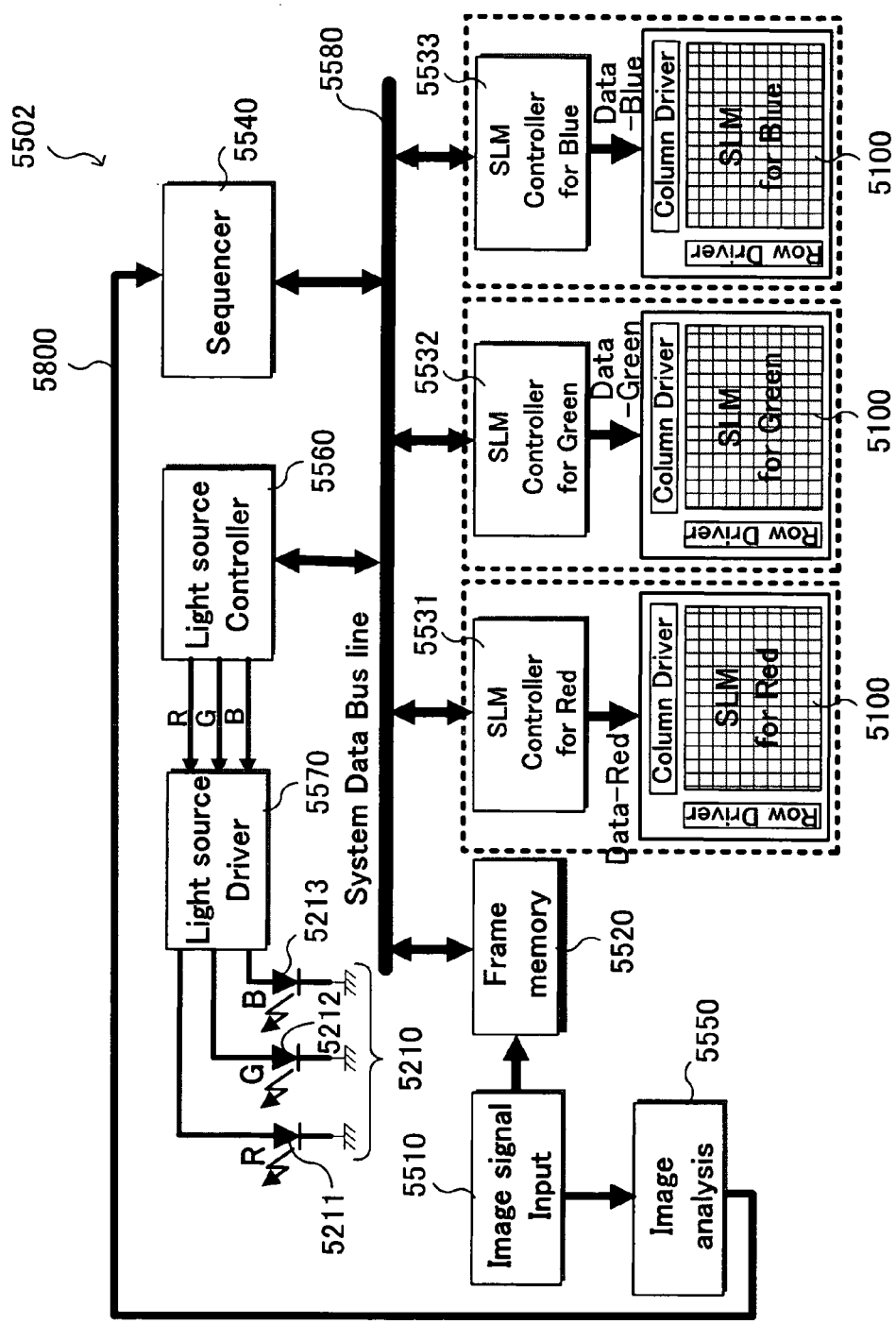
FIG. 8B is a block diagram showing the configuration of a the control unit of a multi-panel projection apparatus according to a preferred embodiment of the present invention.

FIG. 8B is a block diagram exemplifying the configuration of the control unit of a multi-panel projection apparatus according to the present embodiment.

The control unit 5502 comprises a plurality of SLM controllers 5531, 5532 and 5533, which are used for controlling each of the plurality of spatial light modulators 5100 equipped for the respective colors R, G and B, and the comprisal of the controllers is the difference from the above described control unit 5500, otherwise similar.

That is, the SLM controller 5531, SLM controller 5532 and SLM controller 5533 corresponding to the respective color-use spatial light modulators 5100 are equipped on the same substrates as those of the respective spatial light modulators 5100. This configuration makes it possible to place the individual spatial light modulators 5100 and the respectively corresponding SLM controller 5531, SLM controller 5532 and SLM controller 5533 close to each other, thereby enabling a high speed data transfer rate.

Further, a system bus 5580 is equipped for commonly connecting the frame memory 5520, light source control unit 5560, sequencer 5540 and SLM controllers 5531 through 5533, in order to speed up and simplify the connection path of each connecting element.

Figure 9A:
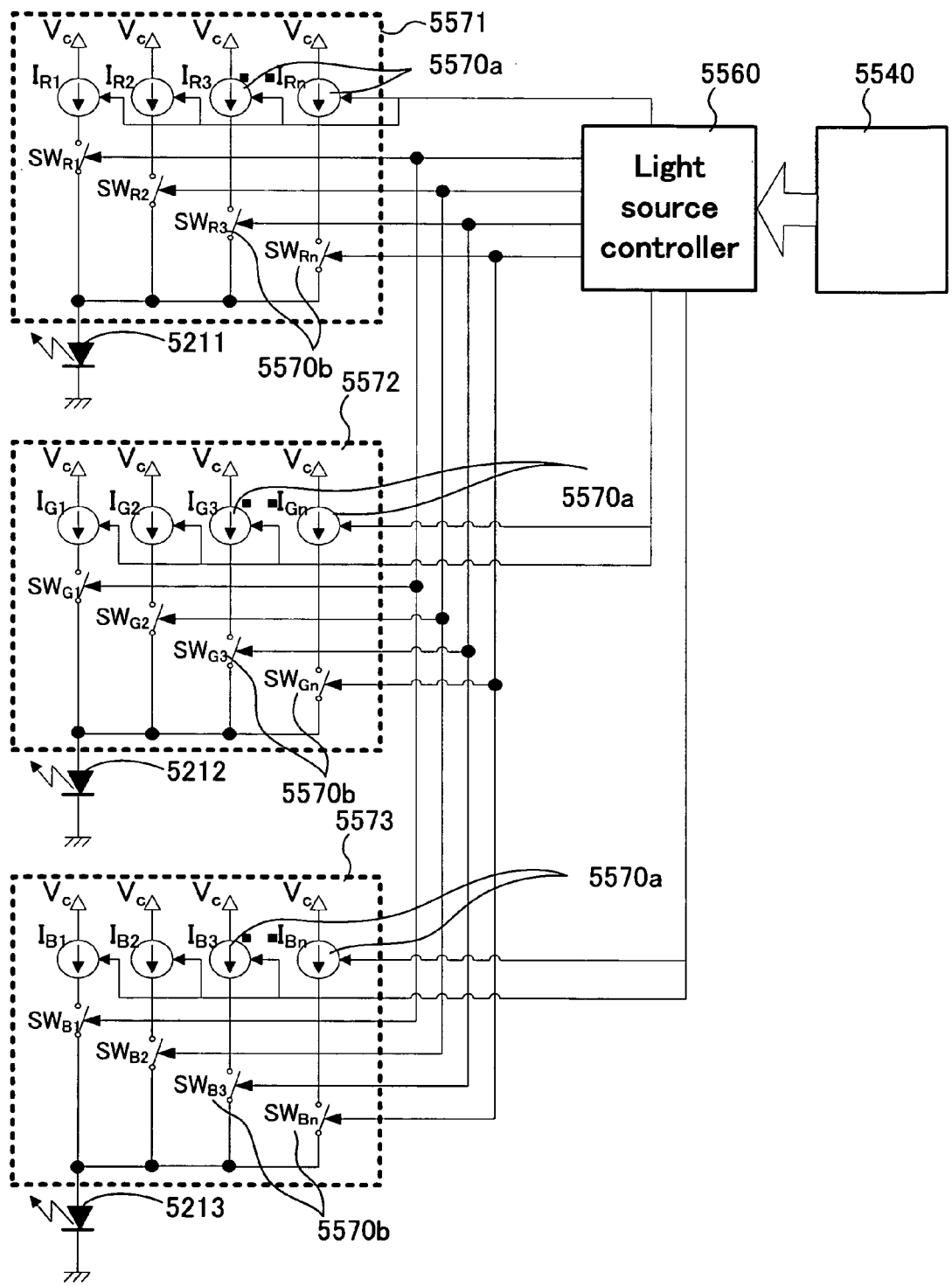
FIG. 9A is a conceptual diagram exemplifying a configuration example of a light source drive circuit of a projection apparatus according to a preferred embodiment of the present invention.

FIG. 9A is a conceptual diagram exemplifying the configuration of the light source drive circuit 5570 (i.e., the light source drive circuits 5571, 5572 and 5573) according to the present embodiment.

The light source drive circuit exemplified in FIG. 9A comprises a plurality of constant current circuits 5570a (i.e., I (R, G, B)$_1$ through I (R, G, B)$_n$) and a plurality of switching circuits 5570b (i.e., switching circuits SW (R, G, B)$_1$ through SW (R, G, B)$_n$), which correspond to the respective constant current circuits 5570a, in order to obtain the desired light intensities of emission P$_1$ through P$_n$ for the light source optical system 5200 (i.e., the red laser light source 5211, green laser light source 5212 and blue laser light source 5213).

The switching circuit 5570b carries out a switching in accordance with a desired emission profile of the light source optical system 5200 (i.e., the red laser light source 5211, green laser light source 5212 and blue laser light source 5213).

The setup values of the output current of the constant current circuits 5570a (i.e., constant current circuits I (R, G, B)$_n$), when the gray scale of the emission intensity of the light source optical system 5200 is designated at N bits (where N≧n), are as follows:

$$I(R,G,B)_1 = I_{th} + \text{LSB}$$

$$I(R,G,B)_2 = \text{LSB} + 1$$

$$I(R,G,B)_3 = \text{LSB} + 2$$

$$\ldots$$

$$\ldots$$

$$I(R,G,B)_n = \text{MSB}$$

Here, what is shown is an example of a gray scale display on the basis of an emission intensity; a similar gray scale display is achievable even if the emission period (i.e., an emission pulse width), emission interval (i.e., an emission cycle), and the like, are made to be variable.

The relationship between the emission intensity Pn of the variable light source and drive current for each color in this case is as follows. Note that "k" is an emission efficiency corresponding to the drive current:

$$P_1 = k^*(I_{th} + I_1)$$

$$P_2 = k^*(I_{th} + I_1 + I_2)$$

$$\ldots$$

$$\ldots$$

$$P_n = k^*(I_{th} + I_1 + I_2 + \ldots + I_{n-1} + I_n)$$

Figure 9B:
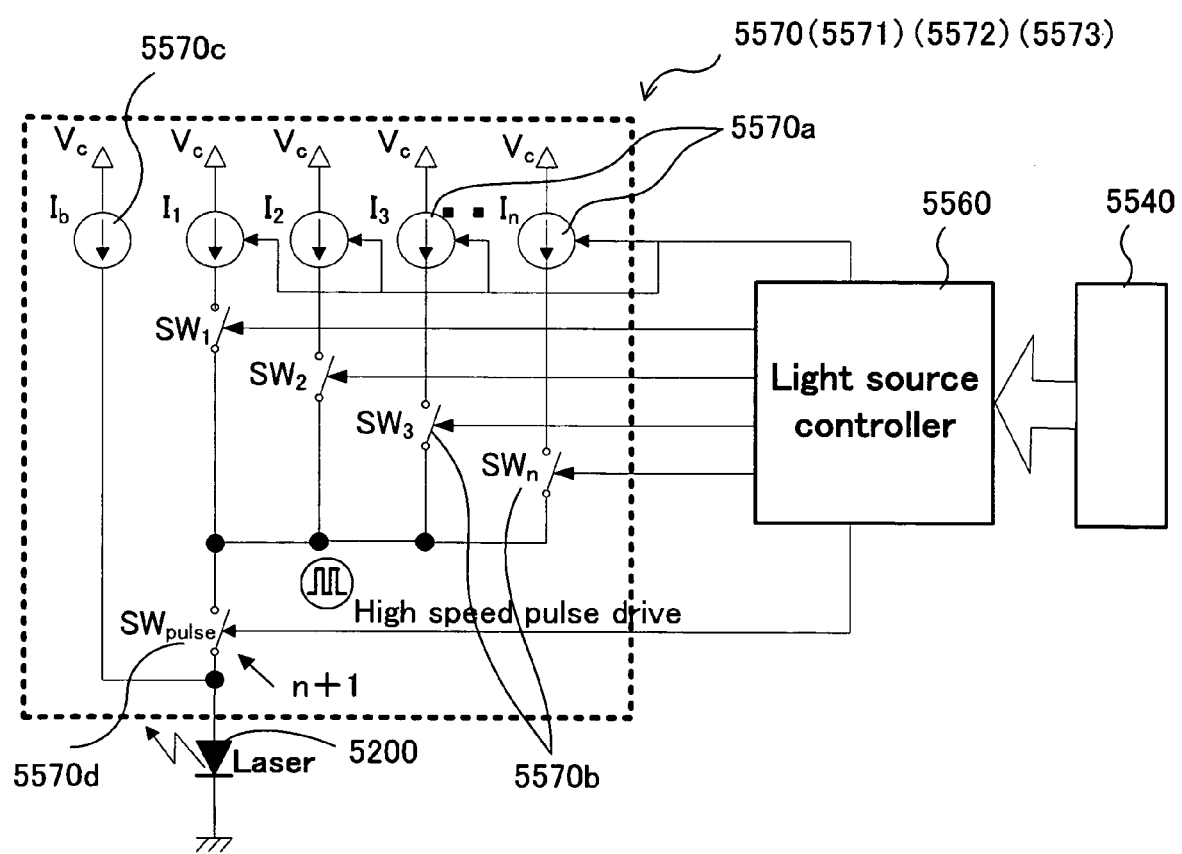
FIG. 9B is a conceptual diagram exemplifying a variation of a configuration example of a light source drive circuit of a projection apparatus according to a preferred embodiment of the present invention.

FIG. 9B is a conceptual diagram showing a modified embodiment of the configuration of the light source drive circuit according to the present embodiment.

For simplicity, FIG. 9B denotes the constant current circuits 5570a (I (R, G, B)$_1$ through I (R, G, B)$_n$) as I$_1$ through I$_n$ and the switching circuits 5570b (SW (R, G, B)$_1$ through SW (R, G, B)$_n$) as switching circuits 5570b (SW$_1$ through SW$_n$).

As described later, the light source drive circuits 5570 according to the present embodiment is configured to make the individual constant current circuit 5570a (i.e., I (R, G, B)$_1$ in this case) supply a current value equivalent to the threshold current I$_{th}$ of the light source optical system 5200, or a current value close to the aforementioned threshold current, as a bias current I$_b$ when a semiconductor laser or the like is used as the light source optical system 5200 because a high speed current drive is required, thereby making it possible to stabilize the respective switching operation of the light source drive circuits 5570 of the present embodiment and also enable a high speed emission.

The light source drive circuits 5570 (i.e., the light source drive circuit 5571, light source drive circuit 5572, light source drive circuit 5573) exemplified in FIG. 9B comprises bias current circuits 5570c which are continuously connected to the light source optical systems 5200 (i.e., the red laser light source 5211, green laser light source 5212 and blue laser light source 5213) and which are used for applying a bias current I$_b$, in addition to comprising the constant current circuits 5570a.

Further, the connection of the constant current circuits 5570a to the entirety of the light source optical systems 5200 is configured to be carried out by means of a switching circuit 5570d (SW$_{pulse}$) equipped on the downstream side of the switching circuits 5570b.

In the case of the configuration shown in FIG. 9B, the relationship between the emission intensity P$_n$ and drive current of the variable light source for each wavelength is as follows, where "k" is the emission efficiency in terms of drive current:

$$P_b = k^* I_b (I_b \approx I_{th})$$

$$P_1 = k^* (I_{th} + I_1)$$

$$P_2 = k^* (I_{th} + I_1 + I_2)$$

...

...

$$P_n = k^* (I_{th} + I_1 + I_2 + \ldots + I_{n-1} + I_n)$$

That is, the relationship between each switching operation and emission output is as follows:

$$SW_{pulse} = \text{OFF}: P_b = k^* I_b [\text{mW}] \text{ (where } I_b \approx I_{th})$$

$$SW_1: P_1 = k^* (I_b + I_1)$$

$$SW_2: P_2 = k^* (I_b + I_1 + I_2)$$

$$SW_n: P_n = k^* (I_b + I_1 + I_2 + \ldots I_{n-1} + I_n)$$

The use of the switching circuits 5570d exemplified in FIG. 9B makes it possible to implement a circuit operation unaffected by a drive current switching over caused by the switching circuits 5570b ($SW_1$ through $SW_n$) that are connected to the respective constant current circuits 5570a. Particularly, a further effect is expected if the above described switching circuits ($SW_1$ through $SW_n$) are switched over when the variable light source (i.e., the variable light source 5210) is not emitting light.

While the bias current value is designated at a fixed current value in the configuration of FIG. 9B, it is alternatively possible to connect the bias current circuit 5570c to the light source control unit 5560 and make the bias current value variable.

Figure 10:
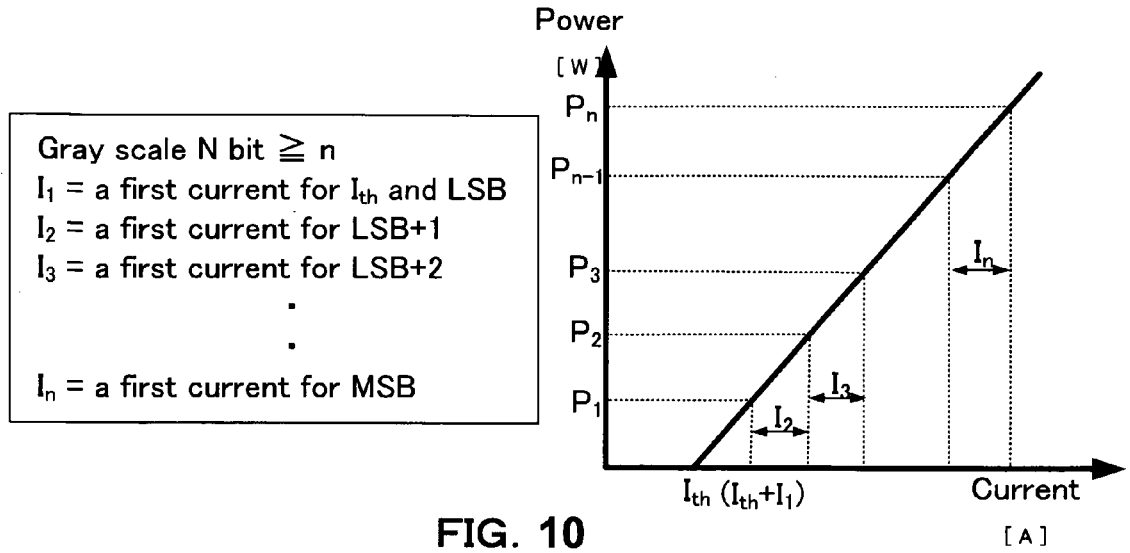
FIG. 10 is a chart showing the relationship between the applied current and the intensity of emission of the light source drive circuit according to a preferred embodiment of the present invention.

FIG. 10 is a chart showing the relationship between the applied current I and emission intensity $P_n$ of the constant current circuit 5570a of the light source drive circuit shown in the above described FIG. 9A.

Figure 11:
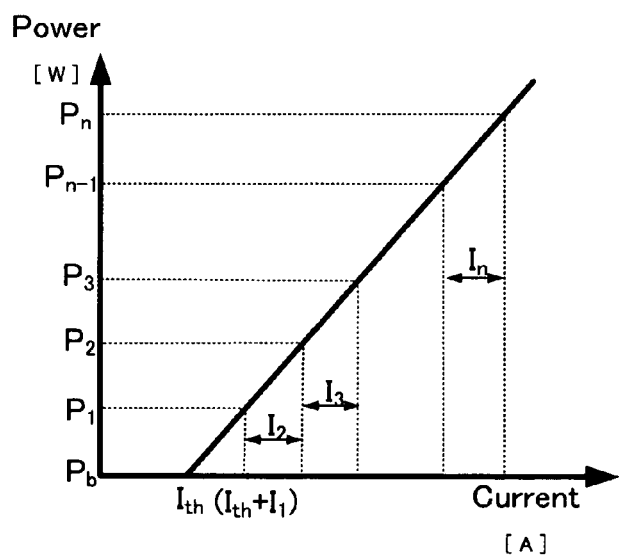
FIG. 11 is a chart showing the relationship between the applied current and the intensity of emission of the constant current circuit according to a preferred embodiment of the present invention.

FIG. 11 is a chart showing the relationship between the applied current I and emission intensity $P_n$ of the constant current circuit 5570a of the light source drive circuit shown in the above described FIG. 9B.

Note that the description for FIGS. 9A and 9B has been provided for the case of changing the emission profiles of the variable light source for each sub-frame corresponding to each gray scale bit; if the display gray scale function of the spatial light modulator 5100 is used in parallel, the number of required levels of electrical current decreases, enabling the reduction in the numbers of constant current circuits 5570a and switching circuits 5570b and also making it possible to obtain the number of gray scales equal to, or higher than, the displayable gray scales of the spatial light modulator 5100.

Next is a description, in detail, of an example of the configuration of the spatial light modulator 5100 according to the present embodiment.

The spatial light modulator 5100 according to the present embodiment is a deflectable mirror device that arranges, in array a plurality of mirror elements.

Figure 12:
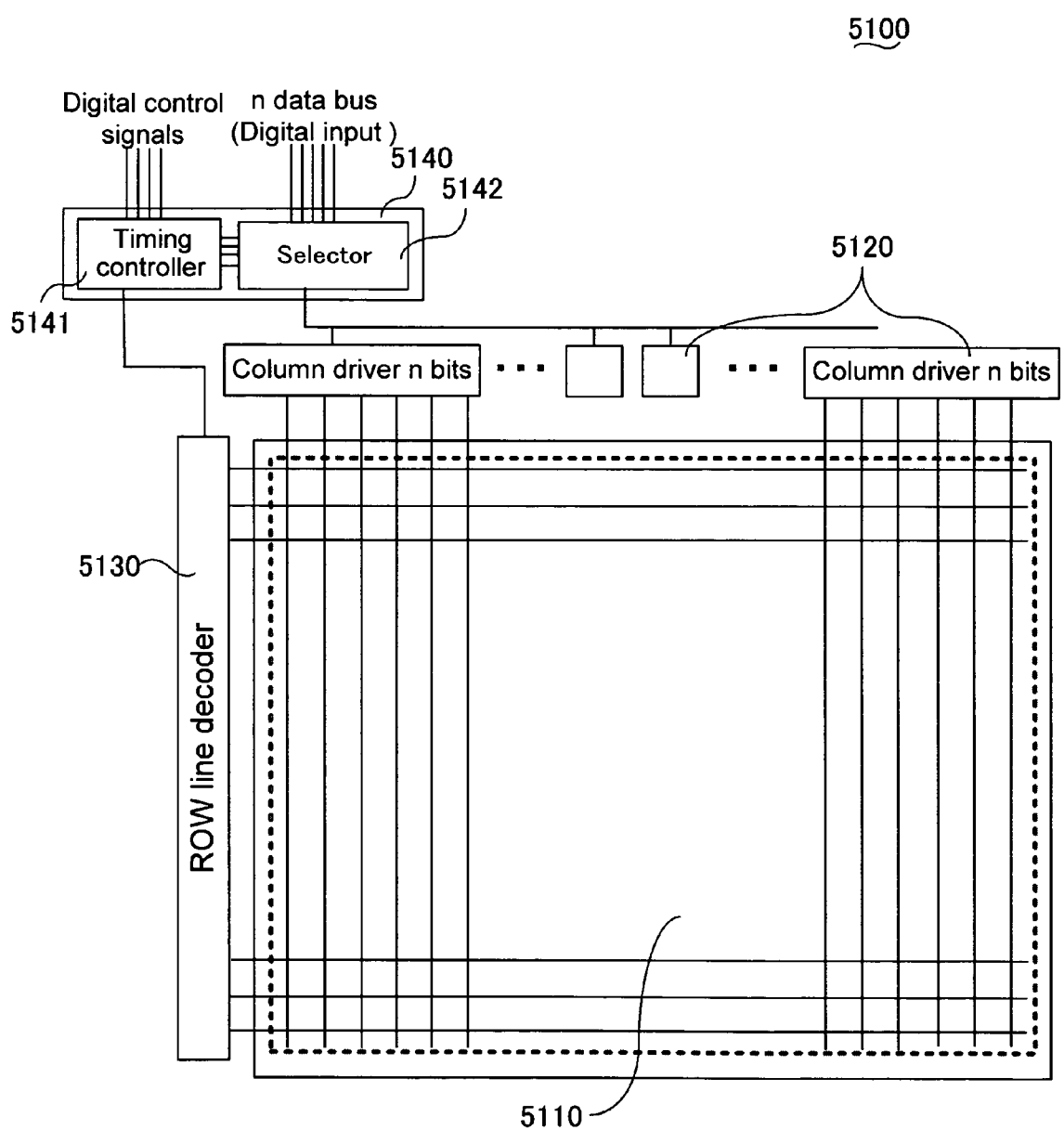
FIG. 12 is a conceptual diagram exemplifying the layout of the internal configuration of a spatial light modulator according to a preferred embodiment of the present invention.

FIG. 12 is a conceptual diagram exemplifying the layout of the internal configuration of the spatial light modulator 5100 according to the present embodiment.

Figure 13:
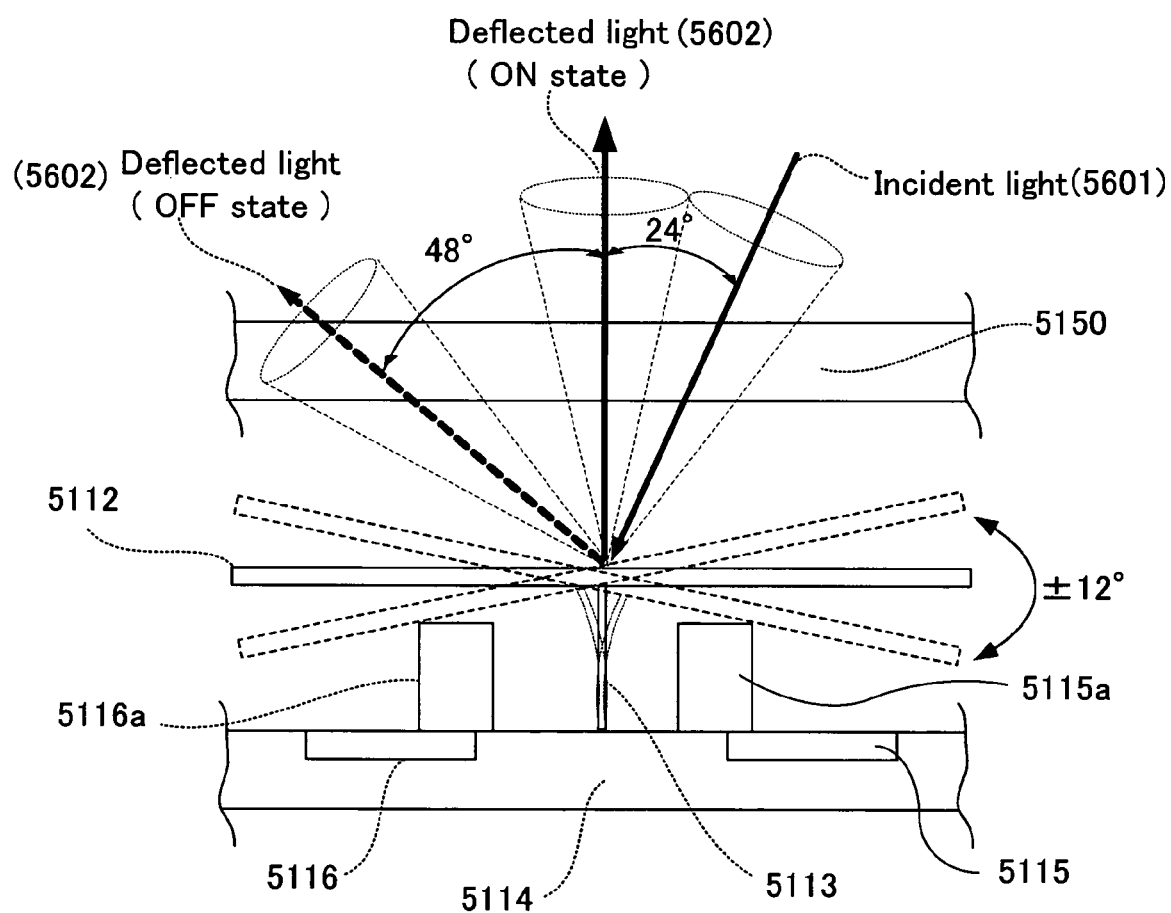
FIG. 13 is a cross-sectional diagram of an individual pixel unit constituting a spatial light modulator according to a preferred embodiment of the present invention.
Figure 14:
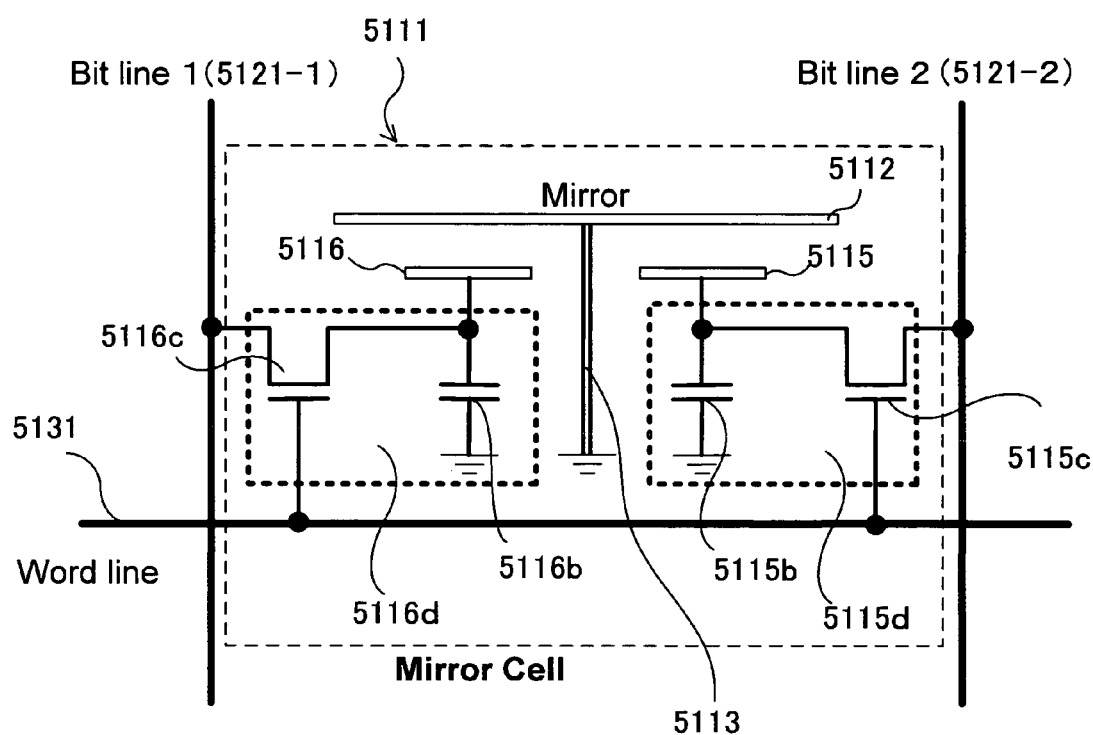
FIG. 14 is a conceptual diagram exemplifying the configuration of individual pixel unit constituting a spatial light modulator according to a preferred embodiment of the present invention.

FIG. 13 is a cross-sectional diagram of an individual pixel unit constituting the spatial light modulator 5100 according to the present embodiment; and FIG. 14 is a conceptual diagram exemplifying the configuration of individual pixel unit constituting the spatial light modulator 5100 according to the present embodiment.

As exemplified in FIG. 12, the spatial light modulator 5100 according to the present embodiment comprises a mirror element array 5110, column drivers 5120, ROW line decoders 5130 and an external interface unit 5140.

The external interface unit 5140 comprises a timing controller 5141 and a selector 5142. The timing controller 5141 controls the ROW line decoder 5130 on the basis of a timing signal from the SLM controller 5530. The selector 5142 supplies the column driver 5120 with digital signal incoming from the SLM controller 5530.

In the mirror element array 5110, a plurality of mirror elements are arrayed at the positions where individual bit lines 5121, which are vertically extended respectively from the column drivers 5120, crosses individual word lines 5131 which are horizontally extended respectively from the ROW line decoders 5130.

As exemplified in FIG. 13 the individual mirror element 5111 comprises a mirror 5112 being freely tiltably supported on a substrate 5114 by way of a hinge 5113. The mirror 5112 is covered with a cover glass 5150 for protection.

An OFF electrode 5116 (and an OFF stopper 5116a) and an ON electrode 5115 (and an ON stopper 5115a) are placed by positioning them symmetrically across the hinge 5113 on the substrate 5114.

The OFF electrode 5116 attracts the mirror 5112 with a coulomb force by the application of a predetermined voltage and tilts the mirror 5112 to a position contacting with the OFF stopper 5116a. This causes the incident light 5601 incident to the mirror 5112 to be reflected to the light path of an OFF position that is offset from the optical axis of the projection optical system 5400.

The ON electrode 5115 attracts the mirror 5112 with a coulomb force by the application of a predetermined voltage and tilts the mirror 5112 to a position contacting with the ON stopper 5115a. This causes the incident light 5601 incident to the mirror 5112 to be reflected to the light path of an ON position matching the optical axis of the projection optical system 5400.

Disclosure Content 3

The following is a description, in detail, of the preferred embodiment of the present invention by referring to the accompanying drawings.

The following description provides various embodiments, with the configurations and operations of the projection apparatuses exemplified in the above described FIGS. 6 through 14 taken into consideration. Note that the same reference symbol is assigned to the same constituent component comprised in the above described promised configurations, and an overlapping description is not provided here.

In the case of the single-panel projection apparatus 5010 (1×SLM; comprising a single SLM) exemplified in the above described FIG. 6 in the case of the present embodiment, one frame of input digital video data 5700 (i.e., a frame 6700-1) is constituted by a plurality of sub-frames 6701, 6702 and 6703 in a time series corresponding to the respective colors R, G and B, and binary data 6704 or non-binary data 6705 is generated for each subfield as described above, as exemplified on the upper side of FIG. 15.

Figure 15:
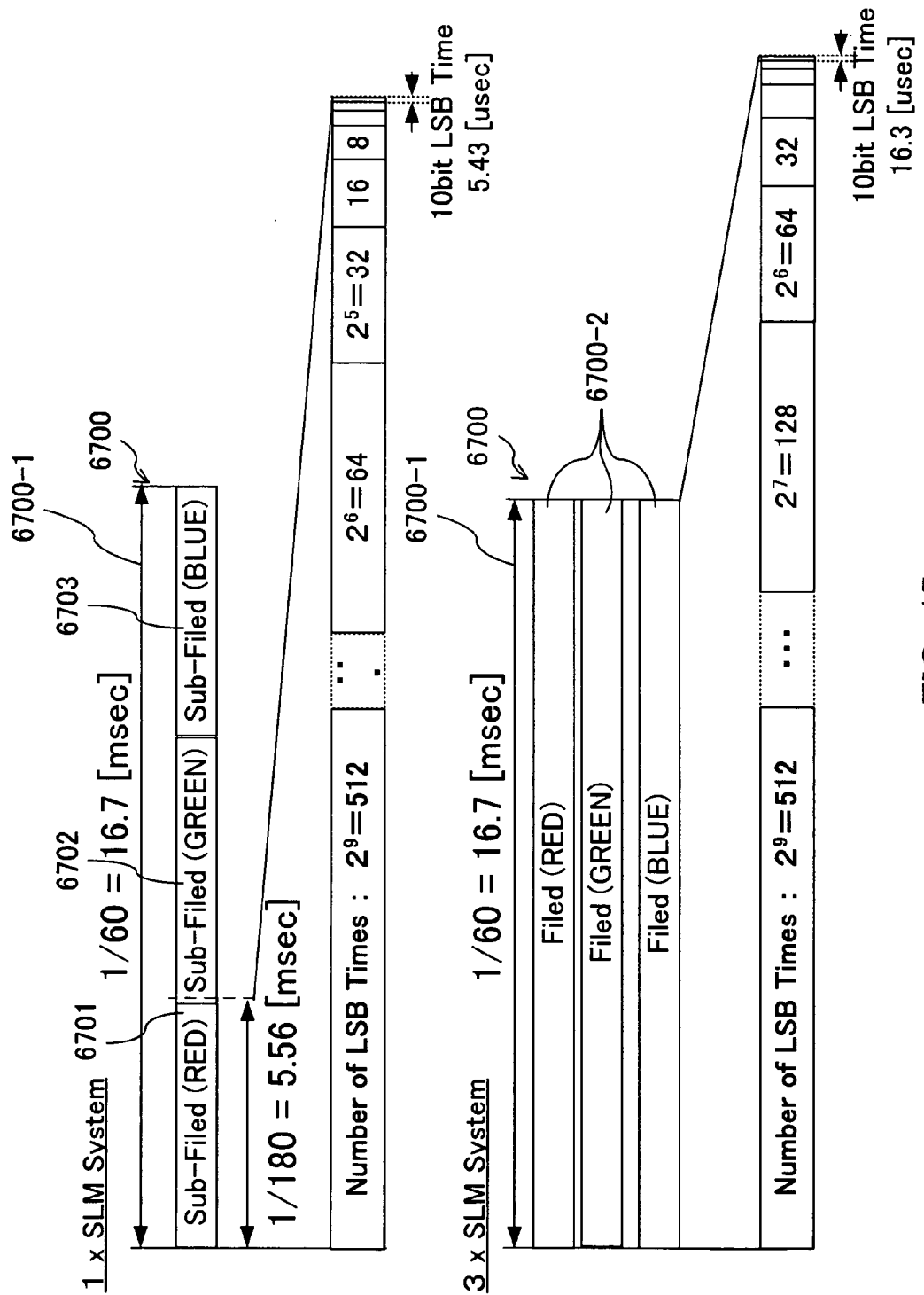
FIG. 15 is a conceptual diagram showing a data configuration of image data used in a preferred embodiment of the present invention.

Meanwhile, in the case of the above described multi-panel projection apparatus 5020 (3×SLM; comprising three SLMs), a plurality of subfields 6700-2 (i.e., equivalent to subfields 6701, 6702 and 6703) corresponding to the respective colors R, G and B are simultaneously and parallelly output to the respective spatial light modulators 5100 and the spatial light modulation for the respective colors are carried out simultaneously and parallelly, during the display period of one frame (i.e., a frame 6700-1) as exemplified on the lower side of FIG. 15.

Also in this case, the above described binary data 6704 or non-binary data 6705 is generated for each subfield 6700-2 of each respective color.

The present embodiment is configured such that the video image analysis unit 5550 of the control unit 5500 detects, from the input digital video data 5700, the timing of a change of the signal waveforms of the binary data 6704 or non-binary data 6705, generates a light source profile control signal 6800 used for controlling the ON/OFF of the red laser light source 5211, green laser light source 5212 and blue laser light source 5213 of the variable light source 5210, and input the signal to the light source control unit 5560 by way of the sequencer 5540.

This configuration implements the ON/OFF control (which is described later) of the variable light source 5210 synchronously with the timing of a change in the signal waveforms of the binary data 6704 or non-binary data 6705 of the input digital video data 5700.

Embodiment 3-1

The embodiment shown in FIG. 8A makes it possible to continuously adjust the intensity of emission of the variable light source 5210 while the spatial light modulator 5100 is driven, that is, during the displaying of an image onto the screen 5900, and change the brightness of a pixel to be displayed, thereby enabling a control of the gray scale characteristic of the display video image. Further, the present embodiment is configured to adjust the emission intensity of the variable light source 5210 using a drive signal used for driving the spatial light modulator 5100, eliminating an extraneous emission of the variable light source 5210, thereby making it possible to suppress the heat therefrom and the power consumption thereof.

Embodiment 3-2

Figure 16A:
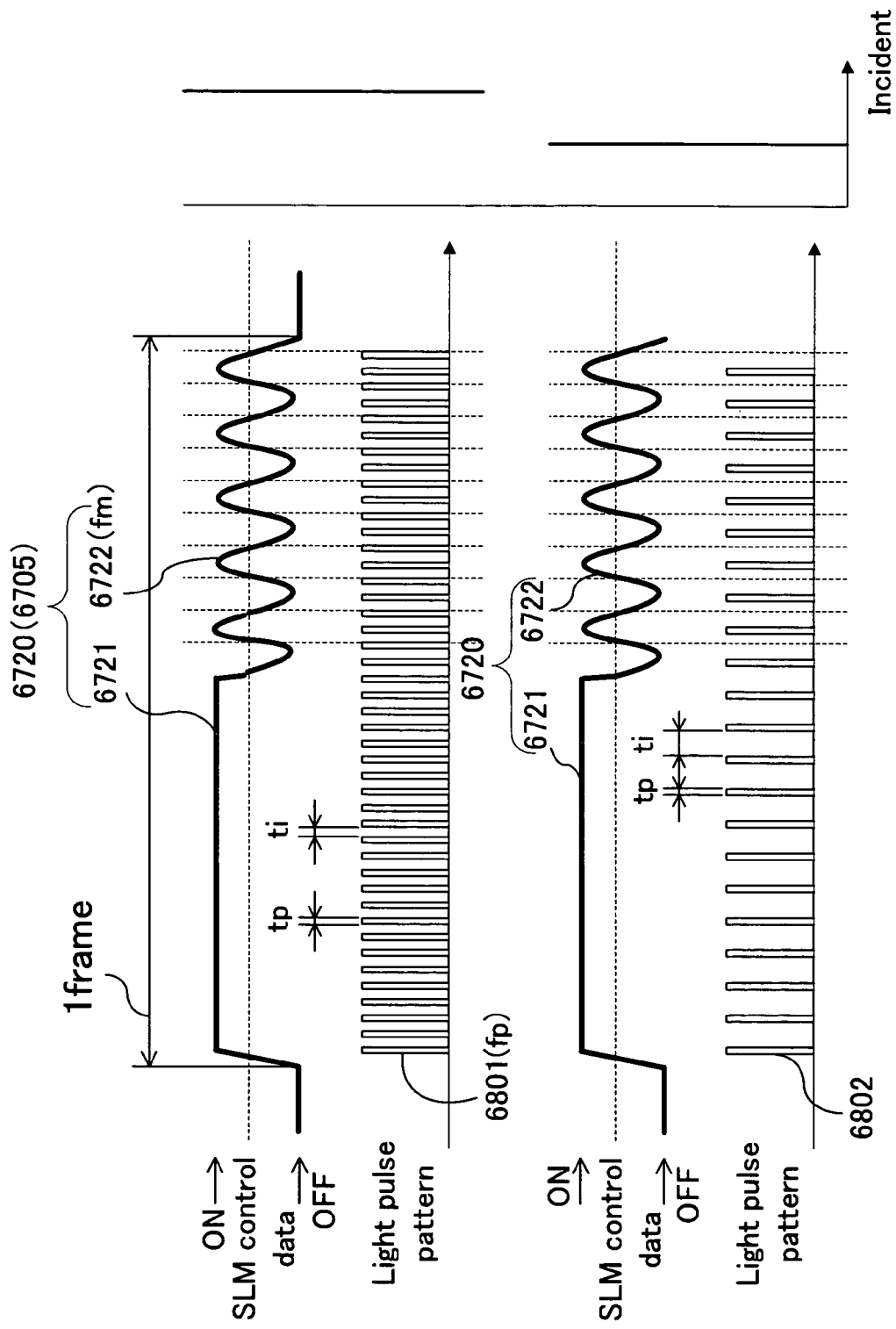
FIG. 16A is a chart exemplifying a control signal of a projection apparatus according to the embodiment of the present invention.

FIG. 16A exemplifies an example of the waveform of a mirror control profile 6720 that is a control signal output from a SLM controller 5530 to a spatial light modulator 5100 and an example of the waveform of a light source pulse pattern 6801 generated by a light source control unit 5560 from a light source profile control signal 5800 corresponding to the aforementioned mirror control profile 6720.

In this case, one frame of the mirror control profile 6720 is constituted by the combination of a mirror ON/OFF control 6721 on the frame head side and a mirror oscillation control 6722 on the tail end side and is used for controlling the tilting operation of the mirror 5112 corresponding to the gray scale of the present frame.

That is, the mirror ON/OFF control 6721 controls the mirror 5112 under either of the ON state and OFF state, and the mirror oscillation control 6722 controls the mirror 5112 under an oscillation state in which it oscillates between the ON state and OFF state.

The present embodiment is configured such that the light source control unit 5560 performs a control so as to change the frequencies of the pulse emission of the variable light source 5210 in accord with the signal (i.e., mirror control profile 6720) driving the spatial light modulator 5100. The spatial light modulator 5100 performs a display of the illumination light 5600 through a spatial light modulation by means of a large number of mirrors 5112 corresponding to the pixels to be displayed and the tilting operation of the mirrors 5112.

Note that, for the mirror oscillation control 6722, the pulse emission frequency fp of the variable light source 5210 emitting the illumination light 5600 is preferably either higher (in the case of the light source pulse pattern 6801 shown in FIG. 16A) by ten times, or more, than the oscillation frequency fm of the oscillation control for the mirror 5112, or lower (in the case of the light source pulse pattern 6802 shown in FIG. 16A) by one tenth, or less, than the frequency fm. The reason is that, if the oscillation frequency fm of the mirror 5112 and the pulse emission frequency fp of the variable light source 5210 are close to each other, a humming occurs to possibly hamper a right display of gray scales by means of the mirror oscillation control 6722.

Figure 16B:
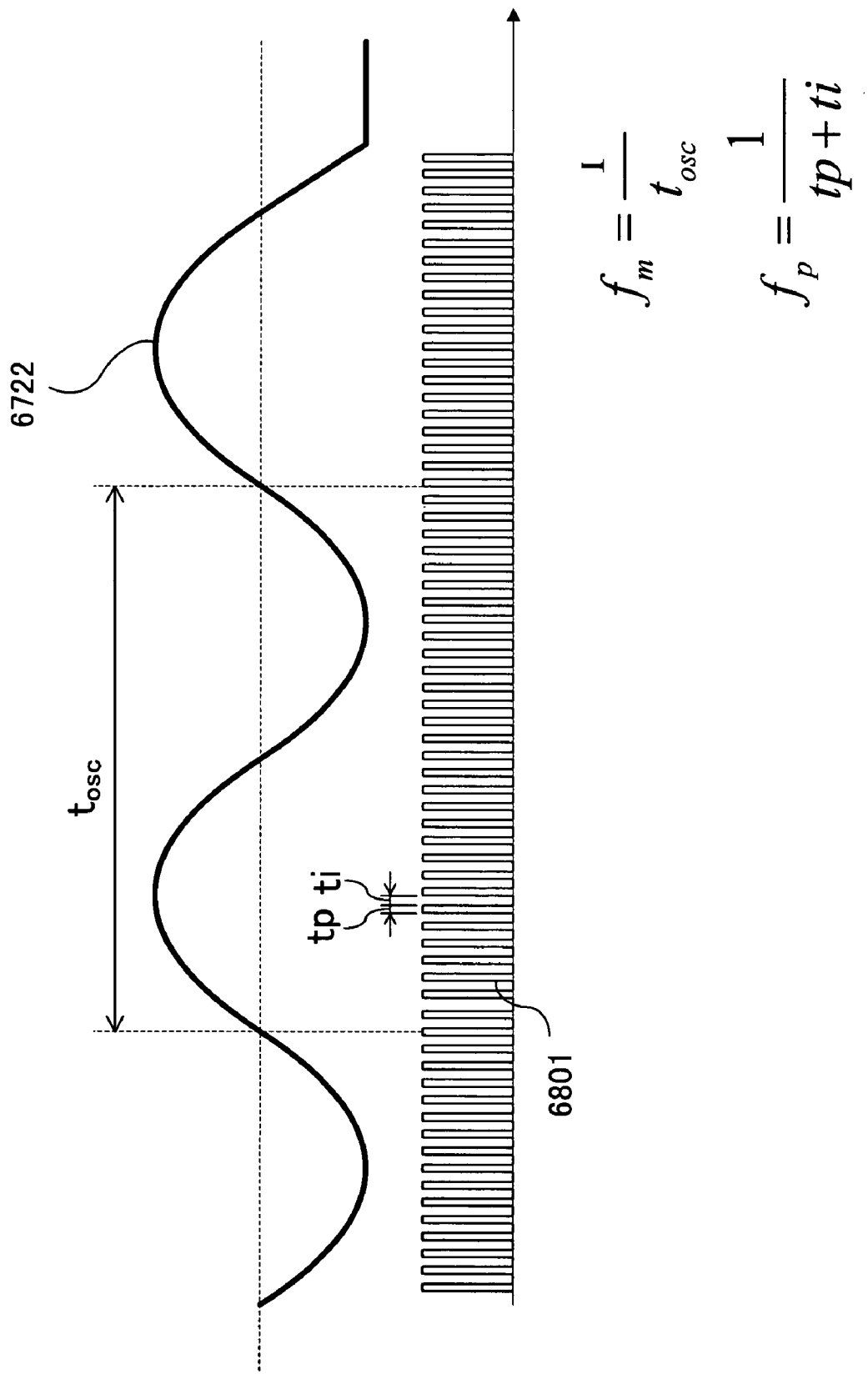
FIG. 16B is a chart showing a control signal, which is shown by enlarging a part thereof, of a projection apparatus according to the embodiment of the present invention.

FIG. 16B is a chart exemplifying the above described light source pulse pattern 6801, which is shown by enlarging a part corresponding to the mirror oscillation control 6722.

The mirror oscillation control 6722 oscillates at an oscillation cycle $t_{osc}$ (1/fm), and in contrast the light source pulse pattern 6801 perform pulse emission at a pulse emission frequency fp (1/(tp+ti)) with [emission pulse width tp+emission pulse interval ti] as one cycle. In this case, the condition is: fp>(fm*10)

That is, in the example of FIG. 16B, about 32 pulses of emission is carried out during the oscillation cycle $t_{osc}$ of the mirror oscillation control 6722.

The present embodiment is configured to change the frequencies of the pulse emission of the variable light source 5210, thereby making it possible to adjust the intensity of the illumination light 5600 emitted therefrom.

FIG. 17 exemplifies the case of a light source pulse pattern 6803 performing a chirp modulation in which the pulse emission frequencies fp of the variable light source 5210 are continuously changed from a high frequency to a low frequency while the spatial light modulator 5100 is driven.

The continuous changing of the pulse emission frequencies fp as exemplified by the light source pulse pattern 6803 makes it possible to extend the number gray scales of a dark part of an image and thereby the detail of the image in dark part can be displayed without allowing an image in bright part to be saturated.

FIG. 18 exemplifies the case in which the spatial light modulator 5100 is driven with a mirror control profile 6710 comprising binary data 6704 generated by the SLM controller 5530 and in which the pulse emission frequencies fp of the variable light source 5210 are changed during a period corresponding to the LSB of the binary data 6704.

FIG. 18 exemplifies the case of lowering the pulse emission frequency fp by increasing an emission pulse interval ti while keeping the emission pulse width tp fixed in the section of the LSB.

The configuration makes it possible to adjust the light intensity of the light source by changing the pulse emission frequencies fp of the variable light source 5210 in the LSB period that is the minimum period for driving the mirror 5112 and therefore increase the number of bits of gray scales.

Figure 19:
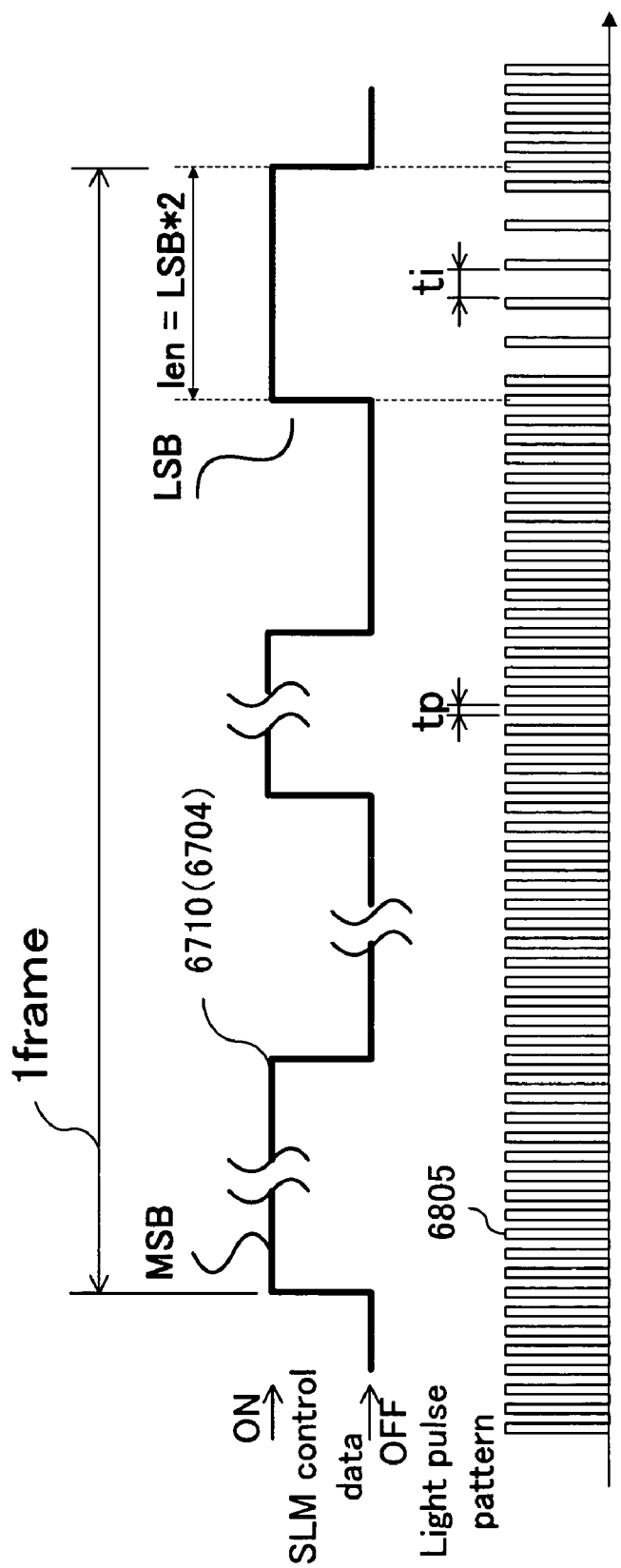
FIG. 19 is another chart exemplifying a control signal using binary data performed in a projection apparatus according to the embodiment of the present invention.

FIG. 19 exemplifies the case of a light source pulse pattern 6805 in which the spatial light modulator 5100 is driven with a mirror control profile 6710 comprising binary data 6704 generated by the SLM controller 5530 and in which the pulse emission frequency fp of the variable light source 5210 is changed to half during the period of the LSB of the mirror control profile 6710.

As described above, the changing of the pulse emission frequency fp of the light source pulse pattern 6805 to half during the LSB period of the mirror control profile 6710 to make the light intensity of the variable light source 5210 halved makes it possible to increase the drive time of the mirror 5112 to two times the LSB period. That is, a use of common light source intensity obtains the same light intensity of the illumination light 5600 as the light intensity obtained during the LSB period.

In this case, the period of drive time of the mirror 5112 can be increased to two times the LSB period and therefore the control of the spatial light modulator 5100 can be simplified. Alternatively, it is possible to increase the number of bits of gray scales.

Embodiment 3-3

Figure 20:
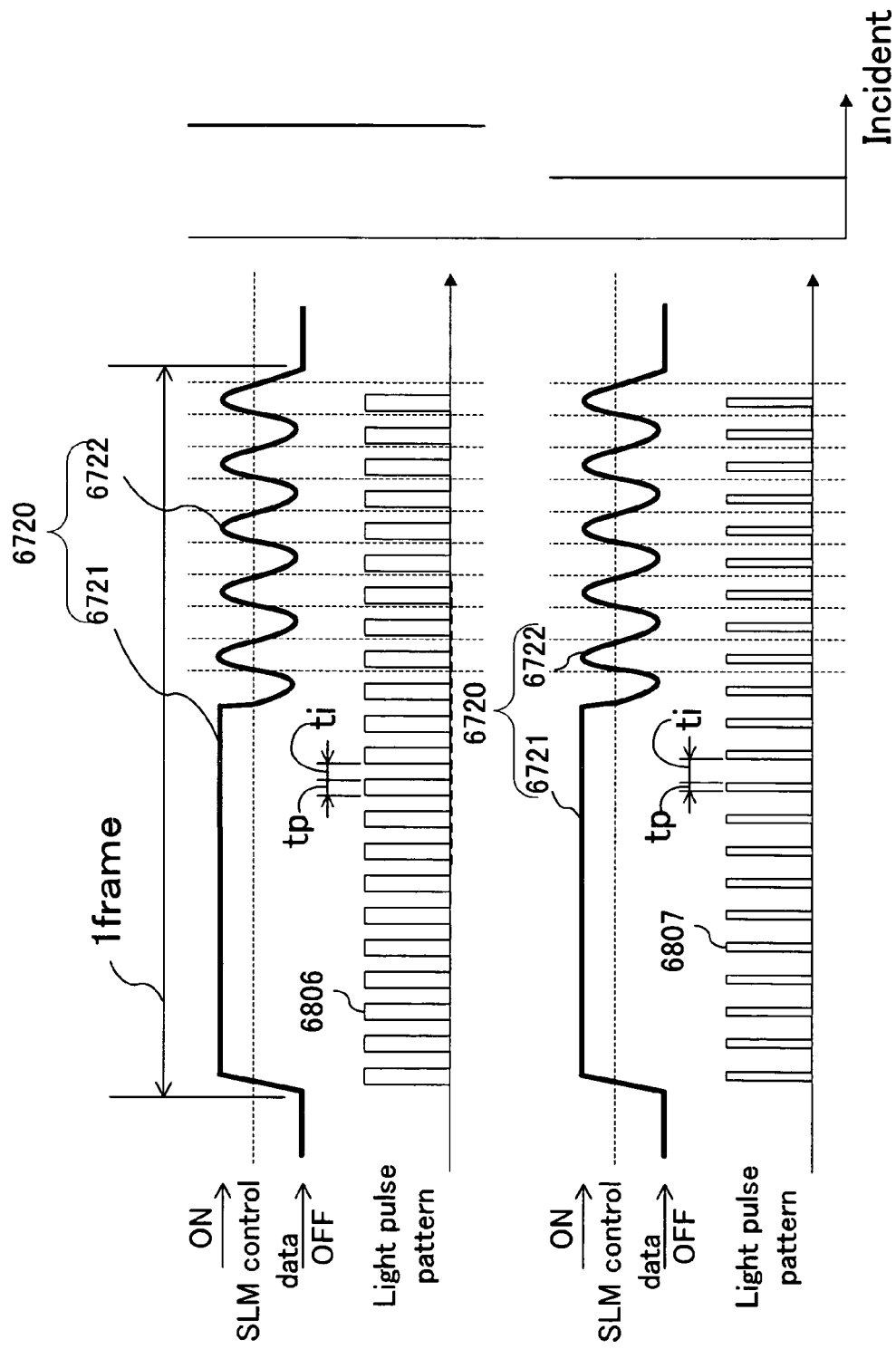
FIG. 20 is a chart showing a control signal, which is shown by enlarging a part thereof, of a projection apparatus according to the embodiment of the present invention.

FIG. 20 exemplifies the case of changing the emission pulse widths tp of the pulse emission of the variable light source 5210 in accord with a signal driving the spatial light modulator 5100.

That is, the control is such as to relatively increase the emission pulse width tp like the light source pulse pattern 6806, or relatively decrease the emission pulse width tp like the light source pulse pattern 6807, depending on the mirror control profile 6720 constituted by the mirror ON/OFF control 5721 and mirror control profile 6720.

As described above, the increasing of the emission pulse width tp with the pulse emission frequency fp (tp+ ti=constant) kept the same makes it possible to increase the emission intensity of the illumination light 5600 emitted from the variable light source 5210.

The present embodiment is configured to change the emission pulse widths tp of the pulse emission of the variable light source 5210 with the pulse emission frequency fp kept at constant, thereby making it possible to adjust the emission intensity of the illumination light 5600, such as a laser light, emitted from the variable light source 5210.

Embodiment 3-4

Figure 21:
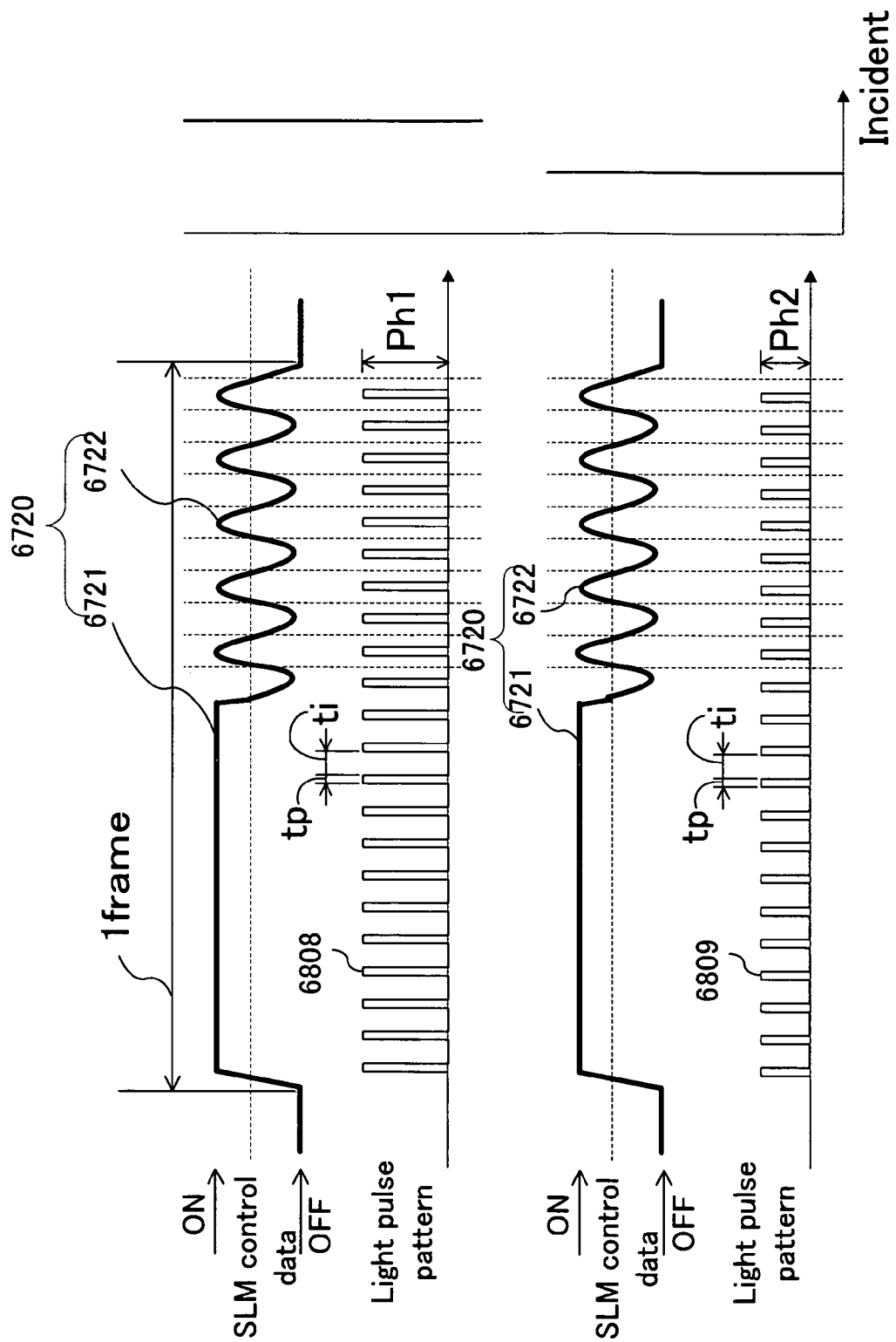
FIG. 21 is a chart exemplifying a control signal of a projection apparatus according to the embodiment of the present invention.

FIG. 21 exemplifies the case of changing the emission light intensities of the emission pulse of the variable light source 5210 in accord with a mirror control profile 6720 driving the spatial light modulator 5100.

That is, the light source pulse pattern 6808 controls, synchronously with the mirror control profile 6720, the emission intensity by using the emission pulse width tp, emission pulse interval ti and emission intensity Ph1.

Further, the light source pulse pattern 6809 controls, synchronously with the mirror control profile 6720, the emission intensity by using an emission intensity Ph2 (<emission intensity Ph1) with the emission pulse width tp and emission pulse interval ti kept at the same.

The present embodiment is configured to change the emission light intensities of the emission pulse, thereby making it possible to adjust the emission intensity of the variable light source 5210 such as a laser.

Embodiment 3-5

Figure 22:
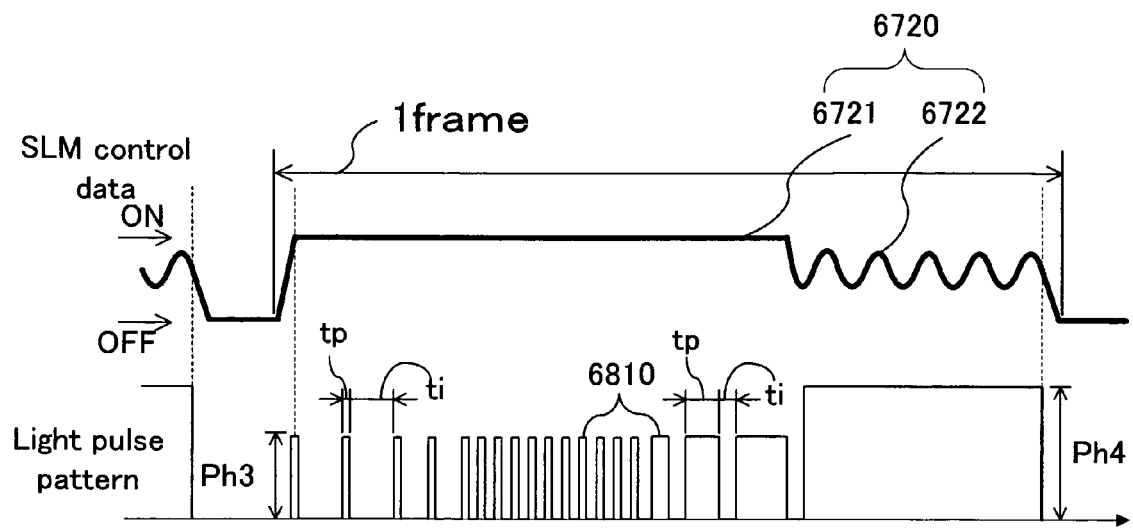
FIG. 22 is another chart exemplifying a control signal of a projection apparatus according to the embodiment of the present invention.

FIG. 22 exemplifies the case of changing the emission light intensities using any one of parameters of the pulse emission frequency, emission pulses width and emission intensity of a pulse or a discretionary combination of any plural parameters from among the aforementioned parameters so as to correspond to the mirror control profile 6720 driving the spatial light modulator 5100.

That is, the light source pulse pattern 6810 shown in FIG. 22 exemplifies the case of changing the pulse emission frequency fp, emission pulse width tp, emission intensity Ph3 and emission intensity Ph4, synchronously with the mirror control profile 6720.

That is, the light source pulse pattern 6810 performs a control such that, in the display period of one frame, first, the pulse emission frequency fp is gradually increased while the emission intensity Ph3 and emission pulse width tp are kept at constant and then the emission pulse width tp is increased in the latter, of the section of mirror ON/OFF control 6721.

Further, in the section of mirror oscillation control 6722, the emission intensity is increased to the emission intensity Ph4 (which is larger than the emission intensity Ph3) and also controlled to an emission pulse width tp that is equal to the width of the present section.

The controlling as the light source pulse pattern 6810 makes it possible to expand the gray scales in, for example, a dark part, enabling a display of detail of the video image in a dark part without allowing the video image in a bright part to be saturated.

The present embodiment enables the gray scale control of an image, which is displayed, by discretionarily changing the parameters, such as pulse emission frequency fp, emission pulse width tp, emission light intensities Ph3 and Ph4, of the pulse emission of the variable light source 5210.

Embodiment 3-6

Figure 23:
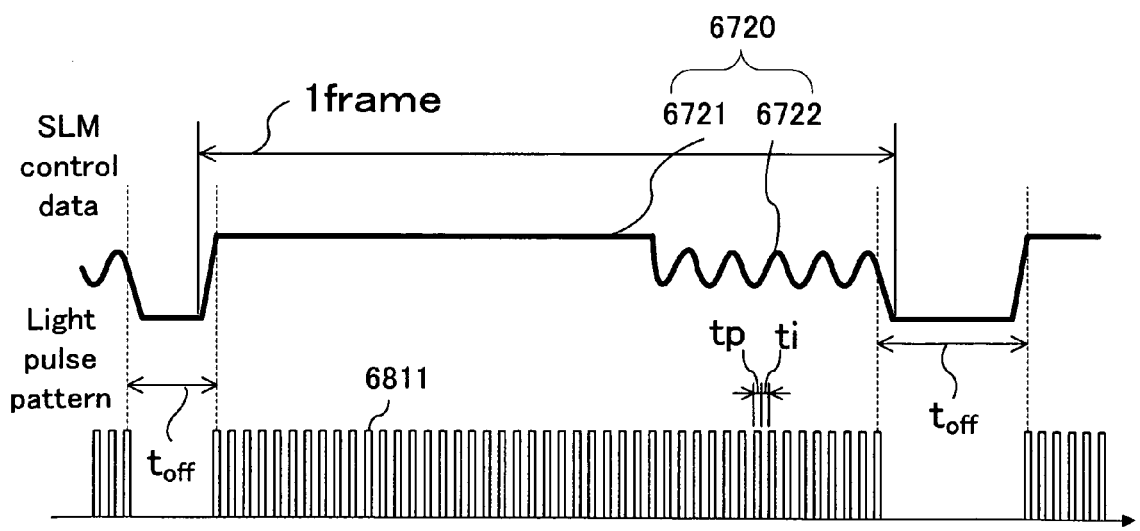
FIG. 23 is still another chart exemplifying a control signal of a projection apparatus according to the embodiment of the present invention.

FIG. 23 exemplifies the control for making a variable light source 5210 perform pulse emission only during the period in which the entire pixels of a spatial light modulator 5100 are driven and suppressing the pulse emission of the variable light source 5210 during the period in which the entire pixels of the spatial light modulator 5100 are not driven.

That is, the light source pulse pattern 6811 shown in FIG. 23 is generated in synchronous with the mirror control profile 6720, makes the variable light source 5210 perform pulse emission during the period of driving the mirror 5112 by means of the mirror control profile 6720 and suppresses the pulse emission during the turn-off period $t_{off}$ between frames.

The present embodiment is configured to make the variable light source 5210 emit light only when the spatial light modulator 5100 is driven and therefore the power consumption of the projection apparatus and the heat generation of the variable light source 5210 can be suppressed.

Embodiment 3-7

Figure 24:
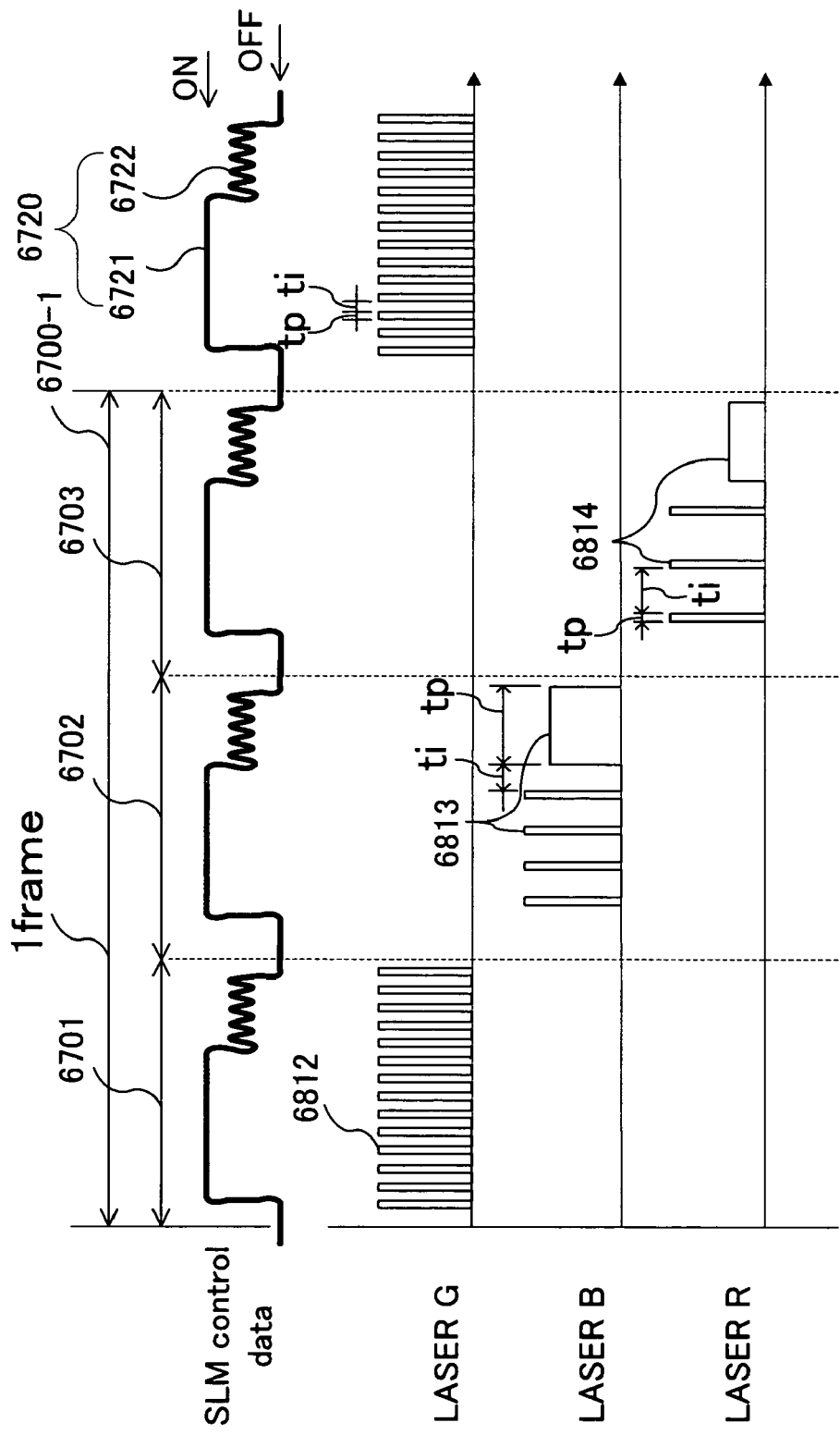
FIG. 24 is yet another chart exemplifying a control signal of a projection apparatus according to the embodiment of the present invention.

FIG. 24 is a chart exemplifying a control for performing a color display by meant of a color sequential control using the control unit 5505, which is exemplified in FIG. 8A, on a single-panel projection apparatus comprising one spatial light modulator 5100 as exemplified in the above described FIG. 6.

The display period of one frame (i.e., frame 6700-1) is allocated, in a time series, to the subfields 6701, 6702 and 6703 corresponding to the respective colors G, R and B.

Then, the pulse emission of the green laser light source 5212 is controlled in accordance with a light source pulse pattern 6812 in the green (G) subfield 6701; the pulse emission of the red laser light source 5211 is controlled in accordance with a light source pulse pattern 6813 in the red (R) subfield 6702; and the pulse emission of the blue laser light source 5213 is controlled in accordance with a light source pulse pattern 6804.

As described above, the light source drive circuit 5570 performs a control so as to adjust the emission light intensities respectively for the red laser light source 5211, green laser light source 5212 and blue laser light source 5213 of the respective colors R, G and B in accordance with the mirror control profile 6720 generated by the SLM controller 5530.

The present embodiment makes it possible to expand the gray scale of the respective colors R, G and B in a color display on a color sequential projection apparatus.

Embodiment 3-8

Figure 25A:
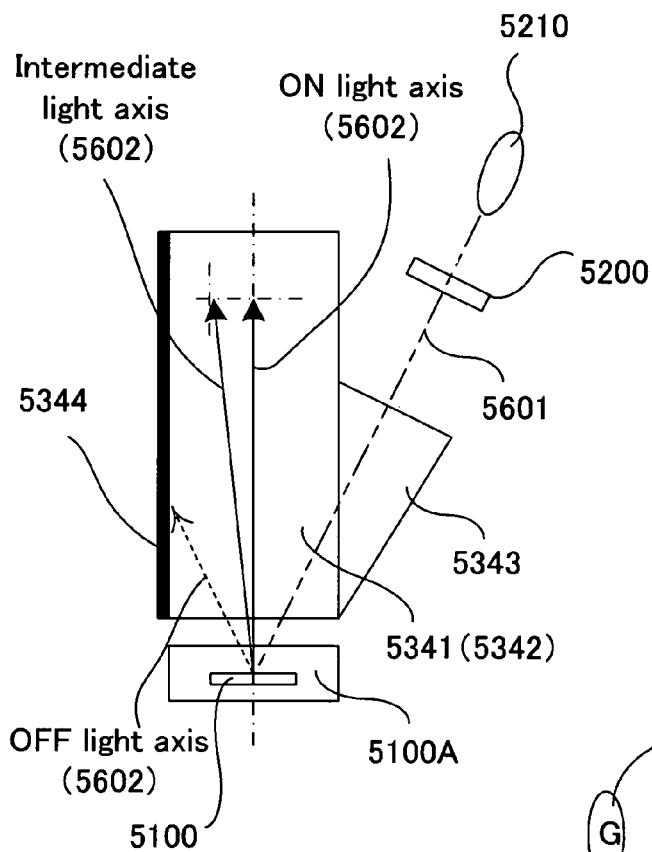
FIG. 25A is a side view diagram of the synthesis optical system of a projection apparatus according to the embodiment of the present invention.
Figure 25B:
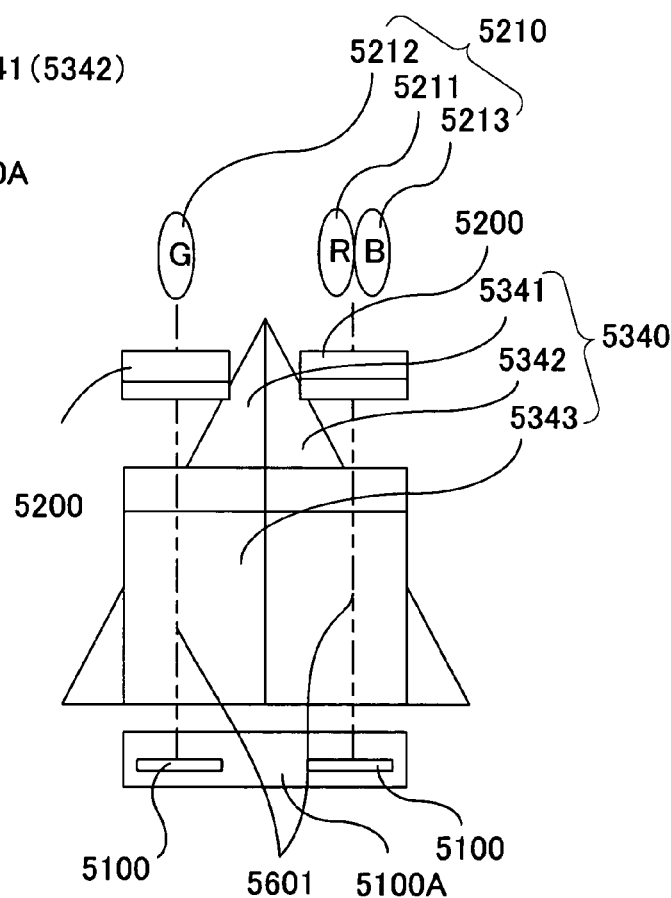
FIG. 25B is a front view diagram of the synthesis optical system of a projection apparatus according to the embodiment of the present invention.

FIGS. 25A and 25B are diagrams altogether showing the configuration of the optical system of a projection apparatus comprising a plurality of spatial light modulators 5100.

FIG. 25A is a side view diagram of a synthesis optical system according to the present embodiment; FIG. 25B is the front view diagram.

The optical system according to the present embodiment comprises a device package 5100A integrally packaging a plurality of spatial light modulators 5100, a color synthesis optical system 5340, a light source optical system 5200 and a variable light source 5210.

The plurality of spatial light modulators 5100 incorporated in the device package 5100A is fixed in a position in which the rectangular contour of the spatial light modulator 5100 is inclined at approximately 45 degrees, on a horizontal plane, relative to each side of the device package 5100A having a similarly rectangular contour.

The color synthesis optical system 5340 is placed on the device package 5100A.

The color synthesis optical system 5340 comprises right-angle triangle pole-shaped prisms 5341 and 5342, which are obtained by joining together so as to make an equilateral triangle column on the longitudinal side, and a right-angle triangle column-shaped light guide block 5343 of which a slope surface is adhesively attached onto the side faces of the prisms 5341 and 5342, with the bottom surface of the light guide block 5343 facing up.

On the prisms 5341 and 5342, a light absorption body 5344 is equipped on the side surface on the reverse side of the face on which the light guide block 5343 is adhesively attached.

The bottom of the light guide block 5343 is equipped with the light source optical system 5200 of the green laser light source 5212, and the light source optical system 5200 of the red laser light source 5211 and blue laser light source 5213, with the optical axis of each of the light source optical systems 5200 maintained vertical.

Further, the illumination light 5600 emitted from the green laser light source 5212 is incident to the spatial light modulator 5100, on one side, which is positioned immediately under the prism 5341, as an incident light 5601, by way of the light guide block 5343 and the present prism 5341.

Also, the illumination lights 5600 respectively emitted from the red laser light source 5211 and blue laser light source 5213 are incident to the spatial light modulator 5100, on the other side, which is positioned immediately under the prism 5342, as the incident light 5601, by way of the light guide block 5343 and the present prism 5342.

The red and blue incident lights 5601 incident to the spatial light modulator 5100 are reflected vertically upward, as reflection lights 5602, in the prism 5342 and are further reflected by the external surface and adhesively attached surface, in this order, of the present prism 5342, then are incident to the projection optical system 5400 and turned to be projection light 5603, in the ON state of a mirror 5112.

Meanwhile, the green incident light 5601 incident to the spatial light modulator 5100 is reflected to vertically upward direction as a reflection light 5602 in the prism 5341 and is further reflected by the external surface of the present prism 5341, is led through the same light path as the red and blue reflection lights 5602 and is incident to the projection optical system 5400, in which the incident light is turned to be projection light 5603, in the ON state of the mirror 5112.

As described above, the mirror device according to the present embodiment is configured to accommodate at least two modules of spatial light modulators 5100 in a single device package 5100A. One module is illuminated only with the incident light 5601 from the green laser light source 5212. The other one module of the spatial light modulator 5100 is illuminated with the incident light 5601 from at least either of the red laser light source 5211 or blue laser light source 5213. Individual modulation lights respectively modulated by two spatial light modulators 5100 are collected at the color synthesis optical system 5340 as described above. The collected light is further expanded by the projection optical system 5400 and projected onto the screen 5900 or the like as the projection light 5603.

Figure 26:
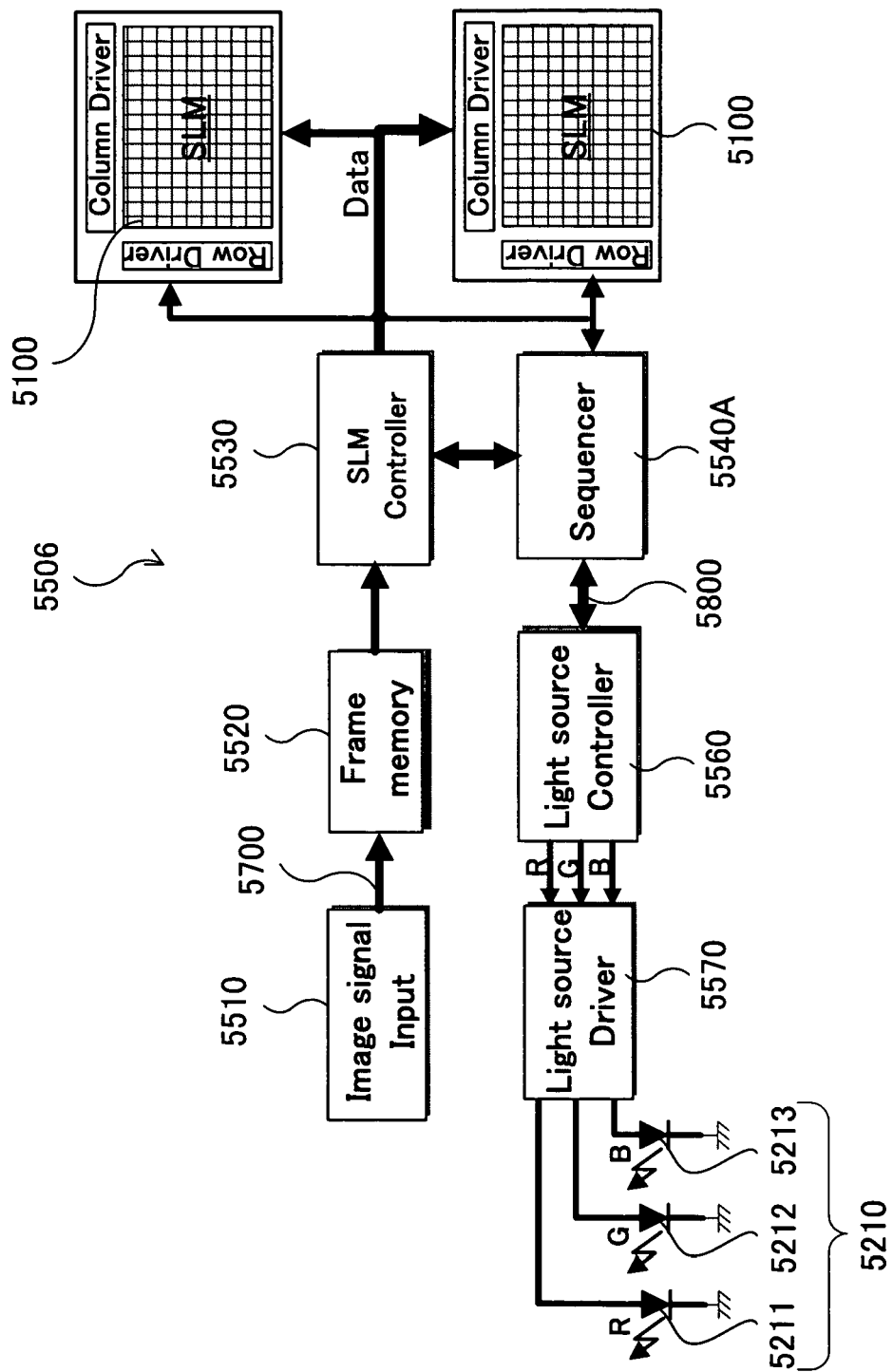
FIG. 26 is a block diagram exemplifying the configuration of a control unit comprised in a projection apparatus according to the embodiment of the present invention.

FIG. 26 is a block diagram exemplifying the configuration of a control unit 5506 comprised in the projection apparatus configured as exemplified in the above described FIGS. 25A and 25B.

Figure 27:
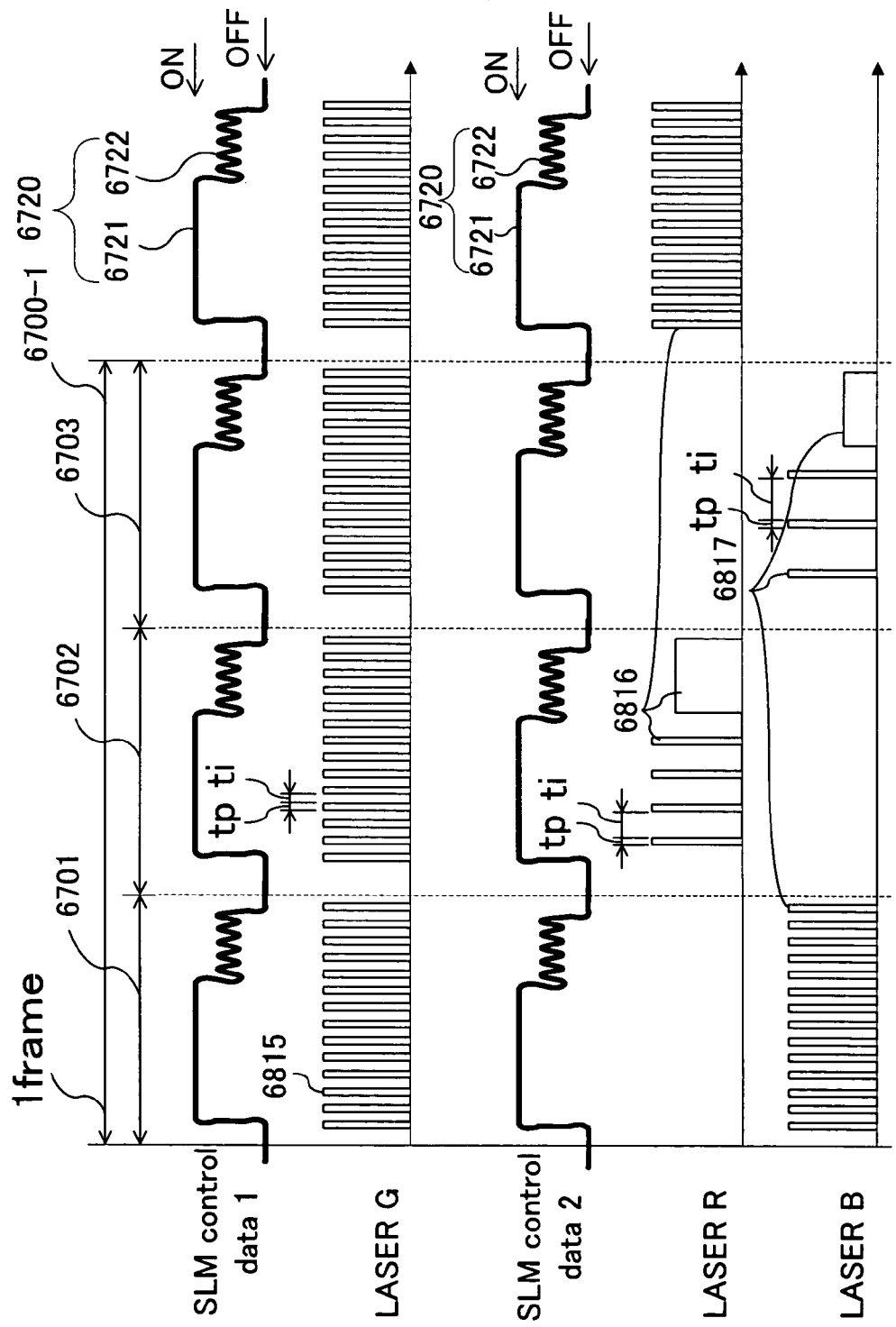
FIG. 27 is a chart showing the waveform of a control signal of a projection apparatus according to the embodiment of the present invention.

FIG. 27 is a chart showing the waveform of a control signal of the projection apparatus according to the present embodiment 3-8.

A drive signal (i.e., the mirror control profile 6720 shown in FIG. 27) generated by the SLM controller 5530 drives the plurality of spatial light modulators 5100 packaged in the device package 5100A.

The light source control unit 5560 generates a light source profile control signal 5800 corresponding to the mirror control profile 6720 that is the signal driving the respective spatial light modulators 5100 and inputs the generated profile 6720 to the light source drive circuit 5570, which in turn adjusts the intensity of the laser lights (i.e., the illumination lights 5600) emitted respectively from the red laser light source 5211, green laser light source 5212 and blue laser light source 5213.

The control unit 5506 of the projection apparatus according to the present embodiment 3-8 is configured such that one SLM controller 5530 drives the plurality of spatial light modulators 5100, and thereby the illumination lights 5600 can be emitted to the respective spatial light modulators 5100 with the most optimal intensity without requiring the individual spatial light modulators 5100 to be equipped with a light source control unit 5560 or light source drive circuit 5570. This configuration simplifies the circuit configuration of the control unit 5506.

As exemplified in FIG. 27, the light source control unit 5560 and light source drive circuit 5570 drive the red laser light source 5211, green laser light source 5212 and blue laser light source 5213 so as to adjust the emission intensities of individual lasers (i.e., the illumination light 5600) of the respective colors R, G and B in synchronous with the respective SLM drive signal (i.e., the mirror control profile 6720) that are generated by the SLM controller 5530.

In this case, a color sequence control is employed for the two colors B and R sharing one spatial light modulator 5100.

That is, one frame is constituted by a plurality of subfields 6701, 6702 and 6703, and the same light source pulse pattern 6815 is repeated in the respective subfields for one spatial light modulator 5100 corresponding to green (G).

Meanwhile, as for red (R) and blue (B), which share one spatial light modulator 5100, the pulse emissions of the red laser light source 5211 and blue laser light source 5213 are controlled so as to use the subfields, i.e., subfields 6701 through 6703, alternately in a time series as indicated by the light source pulse patterns 6816 and 6817, respectively.

The present embodiment makes it possible to increase the gray scale levels for the respective colors R, G and B.

Note that the present invention can be modified in various manners possible within the scope of the present invention, in lieu of being limited to the configurations exemplified in the above described preferred embodiments.

What is claimed is:

1. A projection apparatus, comprising:
   a light source;
   at least one spatial light modulator comprises a plurality of pixel elements controllable to operate in different modulation states for modulating an illumination light projected from the light source;
   a light source control unit controls and modulates the light source; and
   a spatial light modulator control unit receives and applies an input image signal for generating a control signal for driving the spatial light modulator, wherein the light source control unit further having a video image analysis unit for receiving and analyzing the control signal generated by the spatial light modulator control unit for applying video image analysis results for controlling the illumination light emitted from the light source for adjusting an emission intensity of the illumination light to change between a bright image and a dark image or adjusting a ratio between primary colors.

2. The projection apparatus according to claim 1, wherein:
   the light source control unit applies the control signal to adjust a pulse frequency of the light source.

3. The projection apparatus according to claim 1, wherein:
   the light source control unit applies the control signal to adjust a pulse width of the light source.

4. The projection apparatus according to claim 1, wherein:
   the light source control unit applies the control signal to adjust a pulse intensity of the light source.

5. The projection apparatus according to claim 1, wherein:
   the light source control unit applies the control signal to adjust a driving current for driving the light source.

6. The projection apparatus according to claim 1, wherein:
   the light source control unit controls an emission pulse of the light source for each frame or for each sub-frame.

7. The projection apparatus according to claim 1, wherein:
   the spatial light modulator control unit applies the input image signal for generating and transmitting the control signal to the light source control unit.

8. The projection apparatus according to claim 1, wherein:
   the light source further comprises a laser diode or a light emitting diode (LED).

9. The projection apparatus according to claim 1, wherein:
   the spatial light modulator further comprises a digital micromirror device including a plurality of movable mirrors each corresponding to and modulating the illumination light for displaying an image pixel.

10. The projection apparatus according to claim 9, wherein:
    the spatial light modulator control unit controls each of the movable mirrors to operate in an ON state for reflecting the illumination light to the projection optical system to operate in an OFF state for reflecting the illumination light away from the projection optical system, and to operate in an oscillation state for oscillating the movable mirrors between the ON state and the OFF state.

11. The projection apparatus according to claim 10, wherein:
    the light source control unit controls the illumination light emitted from the light source when the light modulator control unit controls the movable mirrors to operate in the ON state or the oscillation state.

12. The projection apparatus according to claim 1, wherein:
    the light source control unit controls light source to project the illumination light during a period when the control signal generated by the spatial light modulator control unit drives the spatial light modulator.

13. The projection apparatus according to claim 1, comprising:
    a plurality of the spatial light modulators, wherein the spatial light modulator control unit generates the control signal for driving the plurality of spatial light modulators; and
    the light source control unit receives and analyzes data corresponding to the control signal for controlling the illumination light emitted from the light source for adjusting the emission intensity of the illumination light to change between a bright image and a dark image or adjusting the ratio between primary colors according to the control signal.

14. A projection apparatus, comprising:
    light sources comprising at least a red (R) light, a green (G) light, and a blue (B) light;
    at least one spatial light modulator for modulating illumination light from the light sources by a plurality of pixel elements by using different modulation states;
    at least one spatial light modulator comprises a plurality of pixel elements controllable to operate in different modulation states for modulating an illumination light projected from the light sources;
    a light source control unit controls and modulates the light source; and
    a spatial light modulator control unit receives and applies an input image signal for generating a control signal for driving the spatial light modulator, wherein the light source control unit further having a video image analysis unit receiving and analyzing the control signal generated by the spatial light modulator control unit for controlling the illumination light emitted from the light sources for applying video image analysis results for adjusting a ration of the emission intensities of the illumination light of the respective red, green and blue (R/G/B) colors.

15. The projection apparatus according to claim 14, wherein:
    the light source control unit controls the emission pulse for the light source of each of the R/G/B colors in sync with the control signal generated by the spatial light modulator control unit.

16. The projection apparatus according to claim 14, wherein:
    the light source control unit applies the control signal to adjust a pulse frequency of the light source.

17. The projection apparatus according to claim 14, wherein:
    the light source control unit applies the control signal to adjust a pulse width of the light source.

18. The projection apparatus according to claim 14, wherein:
    the light source control unit applies the control signal to adjust a pulse intensity of the light source.

19. The projection apparatus according to claim 14, wherein:

the light source further comprises a light emitting diode (LED) or a laser device.

20. A projection apparatus, comprising:
at least a light source for projecting an illumination light of different colors;
a light source control device for controlling the light source;
at least one micromirror device comprises a plurality of mirror elements for reflecting the illumination light projected from the light source;
a micromirror device control device receives and applies an input image signal for generating a control signal for controlling the micromirror device; and
a projection optical system for projecting, to a screen, the illumination light deflected by the micromirror device, wherein the light source control device having a video image analysis unit for receiving and analyzing the control signal generated by the spatial light modulator control unit for applying video image analysis results for controlling the illumination light emitted from the light source to adjust an emission intensity of the illumination light to change between a bright image and a dark image or adjusting a ratio between primary colors.

21. The projection apparatus according to claim 20, wherein:
the micromirror device control device controls each of the mirror elements to operate in an ON state for reflecting the illumination light to the projection optical system to operate in an OFF state for reflecting the illumination light away from the projection optical system and to operate in an intermediate state for oscillating the mirror elements oscillate between the ON state and the OFF state.

22. The projection apparatus according to claim 20, wherein:
the light source further comprises a light emitting diode (LED) or a laser device.

23. The projection apparatus according to claim 20, wherein:
the light source control device further receives and analyzes a control signal generated by the spatial light modulator control unit for adjusting an area size ratio of pulses multiplied by two of the light source control device to control the emission intensity of the illumination light projected from the light source.

24. A projection apparatus comprising:
at least a light source for projecting an illumination light of different colors;
a light source control device for controlling the light source;
at least one micromirror device comprises a plurality of mirror elements for reflecting the illumination light projected from the light source;
a micromirror device control device for controlling the micromirror device; and
a projection optical system for projecting, to a screen, the illumination light deflected by the micromirror device, wherein the light source control device adjusts an emission intensity of the illumination light depending on a brightness during a display period of one frame for each of said colors and a combination of a brightness in the ON state and the intermediate state for each of said colors during the display period of one frame.

25. A projection apparatus comprising:
at least a light source for projecting an illumination light of different colors;
a light source control device for controlling the light source;
at least one spatial light modulator comprises a plurality of modulating elements for modulating the illumination light projected from the light source;
a spatial light modulator control device for controlling the spatial light modulator; and
a projection optical system for projecting, to a screen, the illumination light deflected by the spatial light modulator wherein the light source control device adjusts an emission intensity of the illumination light by adjusting an area size of a pulse of the light source control device to control the emission intensity of the illumination light projected from the light source.

* * * * *